United States Patent
Noorzad et al.

(10) Patent No.: US 10,579,495 B2
(45) Date of Patent: Mar. 3, 2020

(54) SYSTEMS AND METHODS FOR TRANSMITTING DATA USING ENCODER COOPERATION IN THE PRESENCE OF STATE INFORMATION

(71) Applicants: California Institute of Technology, Pasadena, CA (US); The Research Foundation for the State University of New York, Amherst, NY (US)

(72) Inventors: Parham Noorzad, San Diego, CA (US); Michelle Effros, San Marino, CA (US); Michael Langberg, Clarence, NY (US)

(73) Assignees: California Institute of Technology, Pasadena, CA (US); The Research Foundation for the State University of New York, Amherst, NY (US)

( * ) Notice: Subject to any disclaimer, the term of this patent is extended or adjusted under 35 U.S.C. 154(b) by 0 days.

(21) Appl. No.: 15/984,161

(22) Filed: May 18, 2018

(65) Prior Publication Data
US 2018/0336117 A1    Nov. 22, 2018

Related U.S. Application Data

(60) Provisional application No. 62/507,925, filed on May 18, 2017.

(51) Int. Cl.
*H04B 1/38*       (2015.01)
*G06F 11/34*      (2006.01)
(Continued)

(52) U.S. Cl.
CPC ...... *G06F 11/3466* (2013.01); *G06F 11/3006* (2013.01); *G06F 11/3452* (2013.01); *H04L 13/02* (2013.01)

(58) Field of Classification Search
CPC ............................ G06F 11/3466; H04L 13/02
(Continued)

(56) References Cited

U.S. PATENT DOCUMENTS 8,291,224 B2    10/2012    Pelton et al.
8,542,823 B1    9/2013     Nguyen et al.
(Continued)

OTHER PUBLICATIONS

Angus, "The probability integral transform and related results", SIAM Review, Dec. 1994, vol. 36, No. 4, pp. 652-654.
(Continued)

*Primary Examiner* — Helene E Tayong
(74) *Attorney, Agent, or Firm* — KPPB LLP

(57) ABSTRACT

Systems and methods for utilizing cooperation facilitators to achieve joint message and network state cooperation in accordance with various embodiments of the invention are disclosed. One embodiment of the invention includes: a plurality of transmitters; a receiver that has access to at least partial network state information and that includes a decoder configured to decode signals received via a multiple terminal channel from the plurality of transmitters using the at least partial network state information; and a cooperation facilitator. In addition, at least some of the plurality of transmitters are configured to transmit message information to the cooperation facilitator and the cooperation facilitator is configured to generate cooperation parameters based upon the message information and the manner in which state information is utilized by the receiver to decode signals received via the multiple terminal channel. In addition, the cooperation facilitator is configured to transmit cooperation parameters to the plurality of transmitters that select codewords based at least in part upon the received cooperation parameters.

30 Claims, 6 Drawing Sheets

(51) Int. Cl.
  *H04L 13/02* (2006.01)
  *G06F 11/30* (2006.01)
(58) Field of Classification Search
  USPC .......................................................... 375/219
  See application file for complete search history.

(56) References Cited

U.S. PATENT DOCUMENTS

| | | | |
|---|---|---|---|
| 8,843,637 | B2 | 9/2014 | Dietrich et al. |
| 9,722,637 | B2 | 8/2017 | Li et al. |
| 9,806,774 | B2 * | 10/2017 | Lau ...................... H04B 7/0417 |
| 9,906,360 | B2 | 2/2018 | Johnson et al. |
| 10,225,036 | B2 | 3/2019 | Noorzad et al. |
| 2007/0136525 | A1 | 6/2007 | Read |
| 2008/0002581 | A1 * | 1/2008 | Gorsetman ........... H04L 1/0003 370/232 |
| 2009/0016415 | A1 | 1/2009 | Chakrabarti et al. |
| 2009/0310586 | A1 * | 12/2009 | Shatti .................... H04B 7/026 370/338 |
| 2012/0179905 | A1 | 7/2012 | Ackerly |
| 2012/0243679 | A1 | 9/2012 | Obana |
| 2012/0307746 | A1 | 12/2012 | Hammerschmidt et al. |
| 2012/0307747 | A1 | 12/2012 | Macinnis et al. |
| 2013/0198583 | A1 | 8/2013 | Shen et al. |
| 2013/0205181 | A1 | 8/2013 | Blaum et al. |
| 2013/0238900 | A1 | 9/2013 | Leggette et al. |
| 2014/0019774 | A1 | 1/2014 | Nakayama |
| 2014/0140188 | A1 * | 5/2014 | Shattil ................. H04L 27/2601 370/208 |
| 2014/0201541 | A1 | 7/2014 | Paul et al. |
| 2014/0359276 | A1 | 12/2014 | Resch et al. |
| 2015/0043732 | A1 | 2/2015 | Resch et al. |
| 2015/0127946 | A1 | 5/2015 | Miller et al. |
| 2015/0127974 | A1 | 5/2015 | Jiekak et al. |
| 2015/0356305 | A1 | 12/2015 | Volvovski |
| 2016/0006463 | A1 | 1/2016 | Li et al. |
| 2016/0365940 | A1 | 12/2016 | Noorzad et al. |
| 2017/0017581 | A1 | 1/2017 | Huang et al. |
| 2018/0302820 | A1 * | 10/2018 | Heo ........................ H04W 4/70 |

OTHER PUBLICATIONS

Cemel et al, "The multiple-access channel with partial state information at the encoders", IEEE Transactions on Information Theory, Nov. 2005, First Published: Oct. 24, 2005, vol. 51, No. 11, pp. 3992-4003, DOI: 10.1109/TIT.2005.856981.
Costa, "Writing on Dirty Paper", IEEE Transaction on Information Theory, May 1983, vol. IT-29, No. 3, pp. 439-441, DOI: 10.1109/TIT.1983.1056659.
Cover et al., "Elements of Information Theory", Wiley, Oct. 17, 2006, 397 pgs.
El Gamal et al., "Network Information Theory", 2012, Cambridge University Press, 2d edition (presented in 3 parts).
Goldsmith et al., "Capacity of Fading Channels with Channel Side Information", IEEE Transactions on Information Theory, Nov. 1997, vol. 43, No. 6, pp. 1986-1992, DOI: 10.1109/18.641562.
Heegard et al., "On the Capacity of Computer Memory with Defects", IEEE Transactions on Information Theory, Sep. 1983, vol. IT-29, No. 5, pp. 731-739, DOI: 10.1109/TIT.1983.1056723.
Jafar, "Capacity With Causal and Noncausal Side Information: A Unified View", IEEE Transactions on Information Theory, Dec. 2006, First Published: Nov. 30, 2006, vol. 52 , No. 12 , pp. 5468-5474, DOI: 10.1109/TIT.2006.885466.
Lapidoth et al., "The Multiple-Access Channel With Causal Side Information: Common State", IEEE Transactions on Information Theory, Jan. 2013, First Published: Sep. 19, 2012, vol. 59 , No. 1, pp. 32-50, DOI: 10.1109/TIT.2012.2216096.
Lapidoth et al., "The Multiple-Access Channel With Causal Side Information: Double State", IEEE Transactions on Information Theory, Mar. 2013, First Published: Nov. 27, 2012, vol. 59, No. 3, pp. 1379-1393, DOI: 10.1109/TIT.2012.2230214.
Noorzad, "Network Effects in Small Networks: A Study of Cooperation", PhD dissertation, California Institute of Technology, May 22, 2017, 169 pgs., doi:10.7907/Z9M32STV.
Noorzad et al., "Can Negligible Cooperation Increase Network Reliability?", 2016 IEEE International Symposium on Information Theory (ISIT), Jul. 10-15, 2016, Barcelona, Spain, retrieved from https://arxiv.org/abs/1601.05769, 27 pgs.
Noorzad et al., "The Unbounded Benefit of Encoder Cooperation for the k-user MAC", 2016 IEEE International Symposium on Information Theory (ISIT), Jul. 10-15, 2016, Barcelona, Spain, retrieved from https://arxiv.org/abs/1601.06113, 46 pgs.
Permuter et al., "Message and state cooperation in multiple access channels", IEEE Transactions on Information Theory, Oct. 6, 2011, vol. 57, No. 10, pp. 6379-6396, DOI: 10.1109/TIT.2011.2165804.
Somekh-Baruch et al., "Cooperative Multiple-Access Encoding With States Available at One Transmitter", IEEE Transactions on Information Theory, Oct. 2008, First Published: Sep. 16, 2008, vol. 54 , No. 10 , pp. 4448-4469, DOI: 10.1109/TIT.2008.928977.
Tse et al., "Multiaccess Fading Channels—Part I: Polymatroid Structure, Optimal Resource Allocation and Throughput Capacities", IEEE Transactions on Information Theory, Nov. 1998, vol. 44, No. 7, pp. 2796-2815.
Willems, "The discrete memoryless multiple access channel with partially cooperating encoders", IEEE Transactions on Information Theory, May 1983, vol. IT-29, No. 3, pp. 441-445, DOI: 10.1109/TIT.1983.1056660.
Ahlswede, "Multi-way Communication Channels", Proc. International Symposium on Information Theory, 1971, 28 pgs.
Ahlswede, "The Capacity Region of a Channel with Two Senders and Two Receivers", The Annals of Probability, 1974, vol. 2, No. 5, pp. 805-814.
Ahlswede et al., "Network Information Flow", IEEE Transactions on Information Theory, Jul. 2000, vol. 46, No. 4, pp. 1204-1216.
Alon, "Combinatorial Nullstellensatz", Journal of Combinatorics, Probability and Computing Archive, vol. 8, No. 1-2, Jan. 1999, pp. 7-29.
Barwick et al., "Updating the Parameters of a Threshold Scheme by Minimal Broadcast", IEEE Transactions on Information Theory, vol. 51, No. 2, Feb. 2005, pp. 620-633.
Bass, "Real Analysis for Graduate Students", 2013, 2d edition, 418 pgs.
Beimel, "Secret-sharing schemes: a survey", Proceeding IWCC'11 Proceedings of the Third international conference on Coding and Cryptology, May 30-Jun. 3, 2011, Qingdao, China, pp. 11-46.
Beimel et al., "Secret Sharing with Public Reconstruction", IEEE Transactions on Information Theory, vol. 44, No. 5, Sep. 1998, pp. 1887-1896.
Benaloh et al., "Generalized Secret Sharing and Monotone Functions", Proceedings of the 8th Annual International Cryptology Conference on Advances in Cryptology, Aug. 21-25, 1988, pp. 27-35.
Bertsimas et al., "Introduction to Linear Optimization", Athena Scientific, 1997, 588 pgs. (presented in 2 parts).
Billingsley, "Probability and Measure", Wiley Series in Probability and Mathematical Statistics, 3d edition, SIAM, 1995, 608 pgs. (presented in 2 parts).
Bitar et al., "Staircase codes for secret sharing with optimal communication and read overheads", arXiv:1512.02990 [cs.IT], Dec. 9, 2015, 13 pages.
Blakley, "Safeguarding cryptographic keys", Managing Requirements Knowledge, International Workshop on (1979), Jun. 4, 1979 to Jun. 7, 1979, pp. 313-317.
Blakley et al., "Security of ramp schemes", Advances in Cryptology, CRYPTO '84, LNCS 196, 1985, pp. 242-268.
Blaum et al., "Evenodd: an efficient scheme for tolerating double disk failures in RAID architectures", IEEE Transactions on Computers, vol. 44, Issue 2, Feb. 1995, pp. 192-202.
Blaum et al., "MDS array codes with independent parity symbols", IEEE Transactions on Information Theory, vol. 42, No. 2, Mar. 1996, pp. 529-542.
Blundo et al., "Graph decompositions and secret sharing schemes", Journal of Cryptology, vol. 8, No. 1, Dec. 1995, pp. 39-64.

(56) References Cited

OTHER PUBLICATIONS

Boyd et al., "Convex Optimization", Cambridge University Press, 2004, 730 pages.
Brickell, "Some Ideal Secret Sharing Schemes", Proceedings of the Workshop on the Theory and Application of Cryptographic Techniques on Advances in Cryptology—Eurocrypt '89, Houthalen, Belgium, Apr. 10-13, 1989, pp. 468-475.
Cadambe et al., "Asymptotic Interference Alignment for Optimal Repair of MDS Codes in Distributed Storage", IEEE Transactions on Information Theory, vol. 59, No. 5, May 2013, pp. 2974-2987.
Cai, "The Maximum Error Probability Criterion, Random Encoder, and Feedback, in Multiple Input Channels", Entropy, Jan. 2014, vol. 16, pp. 1211-1242.
Capocelli et al., "On the size of shares for secret sharing schemes", Journal of Cryptology, vol. 6, Issue 3, Mar. 1993, pp. 157-167.
Chan et al., "On capacity regions of non-multicast networks", IEEE International Symposium on Information Theory Proceedings, Jul. 2010, pp. 2378-2382.
Chien et al., "A practical (t, n) multi-secret sharing scheme", IEICE Transactions on Fundamentals of Electronics, Communications and Computer Sciences, vol. E83-A, No. 12, Dec. 25, 2000, pp. 2762-2765.
Cormen et al., "Introduction to algorithms", 2d edition, MIT Press, 2001, 985 pgs. (presented in 4 parts).
Cover, "Some Advances in Broadcast Channels", Stanford University—Department of Statistics, Sep. 1974, Technical Report 9, 39 pgs.
Cover et al., "Multiple Access Channels with Arbitrarily Correlated Sources", IEEE Transactions on Information Theory, Nov. 1980, vol. IT-26, No. 6, pp. 648-657.
Dabora et al., "Broadcast Channels with Cooperating Decoders", IEEE Transactions on Information Theory, Dec. 2006, pp. 1-17, arXiv:cs/0505032.
Dembo et al., "Large Deviations Techniques and Applications", Springer-Verlag, 2d Edition, 1998.
Desmedt et al., "Perfectly Secure Message Transmission Revisited", Proceedings of the International Conference on the Theory and Applications of Cryptographic Techniques: Advances in Cryptology, Apr. 29, 2002, pp. 502-517.
Dimakis et al., "A survey on network codes for distributed storage", Proceedings of the IEEE, vol. 99, No. 3, pp. 476-489, Mar. 2011.
Dimakis et al., "Network Coding for Distributed Storage Systems", IEEE Transactions on Information Theory, vol. 56, No. 9, Sep. 2010, pp. 4539-4551.
Dueck, "Maximal error capacity regions are smaller than average error capacity regions for multi-user channels", Problems of Control and Information Theory, 1978, vol. 7, No. 1, pp. 11-19.
Dueck, "The Strong Converse of the Coding Theorem for the Multiple-access Channel", Journal of Combinatorics, Information, and System Sciences, 1981, vol. 6, pp. 187-196.
El Gamal et al., "A proof of Marton's coding theorem for the discrete memoryless broadcast channel", IEEE Transactions on Information Theory, Jan. 1981, vol. IT-27, No. 1, pp. 120-122.
Erdos et al., "Families of Finite Sets in Which No Set is Covered by the Union of r Others", Israel Journal of Mathematics, vol. 51, No. 1-2, Dec. 1985, pp. 79-89.
Franklin et al., "Secure Communication in Minimal Connectivity Models", Journal of Cryptology, vol. 13, No. 1, Jan. 2000, pp. 9-30.
Franklin et al., "Secure Hypergraphs: Privacy from Partial Broadcast", Proceedings of the 27th Annual ACM Symposium on Theory of Computing, Las Vegas, Nevada, May 29-Jun. 1,1995, pp. 36-44.
Goldreich et al., "Fault-tolerant Computation in the Full Information Model", SIAM Journal on Computing, vol. 27, No. 2, Apr. 1998, pp. 506-544.
Gopalan et al., "On the Locality of Codeword Symbols", IEEE Transactions on Information Theory, vol. 58, No. 11, Nov. 2012, pp. 6925-6934.
Gu, "On Achievable Rate Regions for Source Coding Over Networks", Thesis, 2009, 154 pgs.
Gu et al., "A Continuity Theory for Lossless Source Coding over Networks", Forty-Sixth Annual Allerton Conference Communication, Control and Computing, 2008, pp. 1527-1534.
Gu et al., "A Strong Converse for a Collection of Network Source Coding Problems", In the Proceedings of the IEEE International Symposium on Information Theory, Seoul, Korea. Jun. 28-Jul. 3, 2009, pp. 2316-2320.
Han, "The capacity region of general multiple-access channel with certain correlated sources", Information and Control, Jan. 1979, vol. 40, pp. 37-60.
Hekstra et al., "Dependence balance bounds for sing-output two-way channels", IEEE Transaction on Information Theory, Jan. 1989, vol. 35, No. 1, pp. 44-53.
Ho et al., "On Equivalence Between Network Topologies", Allerton Annual Conference on Communications, Control, and Computing, Monticello, IL, Sep. 2010, 8 pgs., arXiv:1010.0654, Oct. 4, 2010.
Hoeffding, "Probability inequalities for sums of bounded random variables", American Statistical Association Journal, Mar. 1963, vol. 58, No. 301, pp. 13-30.
Huang et al., "Characterization of Secrecy Capacity for General MSR Codes under Passive Eavesdropping Model", arXiv:1505.01986v1 [cs.IT], May 8, 2015, 17 pgs.
Huang et al., "Communication Efficient Secret Sharing", arXiv:1505.07515v1 [cs.IT], May 28, 2015, 22 pgs.
Huang et al., "Security Concerns in Minimum Storage Cooperative Regenerating Codes", arXiv:1509.01324v1 [cs.IT], Sep. 4, 2015, 23 pgs.
Hunter, "Matplotlib: A 2D graphics environment", IEEE Computing in Science and Engineering, Jun. 18, 2007, vol. 9, Issue 3, pp. 90-95.
Ito et al., "Multiple assignment scheme for sharing secret", Journal of Cryptology, vol. 6, Issue 1, Mar. 1993, pp. 15-20.
Ito et al., "Secret sharing scheme realizing general access structure", Electronics and Communications in Japan (Part III: Fundamental Electronic Science), vol. 72, No. 9, 1989, pp. 56-64.
Jackson et al., "A Combinatorial Interpretation of Ramp Schemes", Australasian Journal of Combinatorics, vol. 14, 1996, pp. 51-60.
Jafar, "Capacity with Causal and Non-Causal Side Information—A Unified View", IEEE Trans. Inf. Theory, Jan. 2006, vol. 52, No. 12, pp. 5468-5474.
Jalali et al., "On the impact of a single edge on the network coding capacity", Information Theory and Applications Workshop, San Diego, CA, 2011, 5 pgs., arXiv:1607.06793.
Kamath et al., "Codes Wth Local Regeneration and Erasure Correction", IEEE Transactions on Information Theory, vol. 60, No. 8, Aug. 2014, pp. 4637-4660.
Karchmer et al., "On span programs", [1993] Proceedings of the Eighth Annual Structure in Complexity Theory Conference, May 18-21, 1993, San Diego, CA, USA, pp. 102-111.
Karnin et al., "On secret sharing systems", IEEE Transactions on Information Theory, vol. 29, No. 1, pp. 35-41, Jan. 1983.
Kautz et al., "Nonrandom Binary Superimposed Codes", IEEE Transactions on Information Theory, vol. 10, No. 4, Oct. 1964, pp. 363-377.
Kermarrec et al., "Repairing Multiple Failures with Coordinated and Adaptive Regenerating Codes", Proceedings of the International Symposium on Networking Coding, Beijing, China, Jul. 25-27, 2011, 13 pgs.
Koetter et al., "A Theory of Network Equivalence—Part II: Multiterminal Channels", IEEE Transactions on Information Theory, Jul. 2014, vol. 60, No. 7, pp. 3709-3732.
Kosut et al., "Strong Converses are Just Edge Removal Properties", arXiv:1706.08172, Jun. 2017, 53 pgs.
Koyluoglu et al., "Secure Cooperative Regenerating Codes for Distributed Storage Systems", IEEE Transactions on Information Theory, vol. 60, No. 9, Sep. 2014, pp. 5228-5244.
Kramer et al., "Cooperative Communications", Foundations and Trends in Networking, Aug. 2006, vol. 1, No. 3-4, pp. 271-425.
Kurihara et al., "A new (k, n)-threshold secret sharing scheme and its extension", Information Security. ISC 2008. Lecture Notes in Computer Science, vol. 5222, Sep. 15, 2008, pp. 455-470.
Lai et al., "Several generalizations of Shamir's secret sharing scheme", International Journal of Foundations of Computer Science, vol. 15, No. 2, Apr. 2004, pp. 445-458.

(56) References Cited

OTHER PUBLICATIONS

Langberg et al., "Network coding: Is zero error always possible?", arXiv:1102.3162v2 [cs.IT], in Proc. Allerton Conf. Communication, Control and Computing, 2011, 8 pgs.

Langberg et al., "On the capacity advantage of a single bit", IEEE Globecom Workshops, Jul. 2016, 6 pgs.

Langberg et al., "Source coding for dependent sources", IEEE Information Theory Workshop, Sep. 2012, pp. 70-74.

Lapidoth et al., "The Multiple-Access Channel with Causal Side Information: Common State", IEEE Transactions on Information Theory, Jan. 2013, vol. 59, No. 1, pp. 32-50.

Lapidoth et al., "The Multiple-Access Channel with Causal Side Information: Double State", IEEE Transactions on Information Theory, Mar. 2013, vol. 59, No. 3, pp. 1379-1393.

Lee et al., "Outer bounds and a functional study of the edge removal problem", in IEEE Information Theory Workshop, Sep. 2013, 5 pgs.

Li et al., "Cooperative Repair with Minimum-Storage Regenerating Codes for Distributed Storage", Proceedings of the IEEE Conference on Computer Communications—INFOCOM, Toronto, Ontario, Apr. 27-May 2, 2014.

Lovasz, "On Determinants, Matchings, and Random Algorithms", In Fundamentals of Computing Theory, Akademia-Verlag, Berlin, 1979, 10 pgs.

Luchetti, "Convexity and Well-Posed Problems", 1st edition, Springer, 2006, 321 pgs. (presented in 2 parts).

Maric et al., "Capacity of Interference Channels with Partial Transmitter Cooperation", IEEE Transactions on Information Theory, Oct. 2007, vol. 53, No. 10, pp. 3536-3548.

Martin et al., "Changing Thresholds in the Absence of Secure Channels", Australian Computer Journal, vol. 31, No. 2, 1999, pp. 34-43.

Marton, "A Coding Theorem for the Discrete Memoryless Broadcast Channel", IEEE Transactions on Information Theory, May 1979, vol. IT-25, No. 3, pp. 306-311.

McEliece et al., "On sharing secrets and Reed-Solomon codes", Communications of the ACM, vol. 24, No. 9, Sep. 1981, pp. 583-584.

Noorzad, "Network Effect in Small Networks: A Study of Cooperation", Thesis, Jun. 2017, 169 pgs.

Noorzad et al, "On the power of cooperation: can a little help a lot? (extended version)", Jan. 2014, arXiv:1401.6498, 10 pgs.

Noorzad et al., "Can Negligible Cooperation Increase Capacity? The Average-Error Case", arXiv: 1801.03655v1, Jan. 11, 2018, 20 pgs.

Noorzad et al., "On the Cost and Benefit of Cooperation (extended version)", Proc. IEEE Int. Symp., Information Theory, 2015, 15 pgs., arXiv:1504.04432.

Noorzad et al., "On the Power of Cooperation: Can a Little Help a Lot? (Extended Version)", arXiv:1401.6498v2, Apr. 27, 2014, 10 pgs.

Noorzad et al., "The Benefit of Encoder Cooperation in the Presence of State Information", arXiv: 1707.05869v1, Jul. 18, 2017, 20 pgs.

Ogata et al., "Some Basic Properties of General Nonperfect Secret Sharing Schemes", Journal of Universal Computer Science, vol. 4, No. 8, Aug. 28, 1998, pp. 690-704.

Papailiopoulos et al., "Repair Optimal Erasure Codes Through Hadamard Designs", IEEE Transactions on Information Theory, vol. 59, No. 5, May 2013, pp. 3021-3037.

Pawar et al., "Securing Dynamic Distributed Storage Systems against Eavesdropping and Adversarial Attacks", arXiv:1009.2556v2 [cs.IT], Apr. 27, 2011, 19 pgs.

Prakash et al., "Codes with Locality for Two Erasures", Proceedings of the IEEE International Symposium on Information Theory, Honolulu, Hawaii, Jun. 29-Jul. 4, 2014, pp. 1962-1966.

Rashmi et al., "Optimal exact-regeneration codes for distributed storage at the MSR and MBR points via a product-matrix construction", IEEE Transactions on Information Theory, vol. 57, Issue: 8, Aug. 2011, pp. 5227-5239.

Rawat et al., "Centralized Repair of Multiple Node Failures with Applications to Communication Efficient Secret Sharing", aeXiv:1603.04822v1, Mar. 15, 2016, 37 pgs.

Rawat et al., "Cooperative local repair in distributed storage", EURASIP Journal on Advances in Signal Processing, vol. 2015, No. 107, Dec. 23, 2015, 17 pgs.

Rawat et al., "Optimal Locally Repairable and Secure Codes for Distributed Storage Systems", IEEE Transactions on Information Theory, vol. 60, No. 1, Jan. 2014, pp. 212-236.

Rouayheb et al., "Secure Network Coding for Wiretap Networks of Type II", IEEE Transactions on Information Theory, vol. 58, No. 3, Mar. 2012, pp. 1361-1371.

Safavi-Naini et al., "Secret Sharing Schemes with Partial Broadcast Channels", Designs, Codes and Cryptography, vol. 41, No. 1, Oct. 2006, pp. 5-22

Sarwate et al., "Some observations on limited feedback for multi-access channels", IEEE International Symposium on Information Theory, Aug. 2009, pp. 394-397.

Sasidharan et al., "A High-Rate MSR Code Wth Polynomial Sub-Packetization Level", arXiv:1501.06662v1 [cs.IT], Jan. 27, 2015, 5 pgs.

Schneider, "Convex Bodies: The Brunn-Minkowski Theory", Cambridge University Press, 1993, 22 pgs.

Scouarnec, "Exact scalar minimum storage coordinated regenerating codes", Proceedings of the IEEE International Symposium on Information Theory, Cambridge, Massachusetts, Jul. 1-6, 2012, 9 pgs.

Shah et al., "Information-theoretically Secure Regenerating Codes for Distributed Storage", arXiv:1107.5279v1 [cs.IT], Jul. 26, 2011, 6 pgs.

Shamir, "How to share a secret", Communications of the ACM, vol. 22, No. 11, Nov. 1979, pp. 612-613.

Shannon et al., "A Mathematical Theory of Communication", The Bell System Technical Journal, vol. 27, Jul., Oct. 1948, 379-423, 623-656.

Shum et al., "Cooperative Regenerating Codes", arXiv:1207.6762v5 [cs.IT], Jul. 19, 2013, 29 pgs.

Simeone et al., "Three-User Gaussian Multiple Access Channel with Partially Cooperating Encoders", in Circuits, Systems, Computers, 1977, 5 pgs.

Slepian et al., "A coding theorem for multiple access channels with correlated sources", Bell System Technical Journal, Sep. 1973, vol. 52, No. 7, pp. 1037-1076.

Somekh-Baruch et al., "Cooperative Multiple Access Encoding with States Available at One Transmitter", IEEE Transaction on Information Theory, Sep. 16, 2008, vol. 54, No. 10, pp. 4448-4469.

Song et al., "Locally Repairable Codes with Functional Repair and Multiple Erasure Tolerance", arXiv:1507.02796v3 [cs.IT], Jul. 29, 2015, 21 pgs.

Spencer, "Ten Lectures on the Probabilistic Method", Society for Industrial and Applied Mathematics, 1994, 97 pgs.

Steinfeld et al., "Lattice-based threshold-changeability for standard CRT secret-sharing schemes", Finite Fields and Their Applications, vol. 12, No. 4, Nov. 2006, pp. 653-680.

Steinfeld et al., "Lattice-Based Threshold-Changeability for Standard Shamir Secret-Sharing Schemes", International Conference on the Theory and Application of Cryptology and Information Security, ASIACRYPT 2004: Advances in Cryptology, pp. 170-186.

Stinson, "An explication of secret sharing", Designs, Codes, and Cryptography, vol. 2, Issue 4, Dec. 1992, pp. 357-390.

Stinson et al., "Secure frameproof codes, key distribution patterns, group testing algorithms and related structures", Journal of Statistical Planning and Inference, vol. 86, No. 2, May 1, 2000, pp. 595-617.

Stinson et al., "Some New Bounds for Cover-Free Families", Journal of Combinatorial Theory, Series A, vol. 90, No. 1, Apr. 2000, pp. 224-234.

Tamo et al., "Zigzag codes: MDS array codes with optimal rebuilding", IEEE Transactions on Information Theory, vol. 59, Issue 3, Mar. 2013, pp. 1597-161.

Tamo et al., "A Family of Optimal Locally Recoverable Codes", IEEE Transactions on Information Theory, vol. 60, No. 8, Aug. 2014, pp. 4661-4676.

(56) References Cited

OTHER PUBLICATIONS

Ulrey, "The Capacity Region of a Channel with s Senders and r Receivers", Information and Control, Nov. 1975, vol. 29, pp. 185-203.
Wang et al., "On secret reconstruction in secret sharing schemes", IEEE Transactions on Information Theory, vol. 54, No. 1, Jan. 2008, pp. 473-480.
Wang et al., "Exact Cooperative Regenerating Codes with Minimum-Repair-Bandwidth for Distributed Storage", Proceedings of the IEEE INFOCOM, Turin, Italy, Apr. 14-19, 2013, 7 pgs.
Wang et al., "Optimal Rebuilding of Multiple Erasures in MDS Codes", arXiv:1603.01213v1 [cs.IT], Mar. 3, 2016, 22 pgs.
Watanabe, "Information theoretical analysis of multivariate correlation", IBM J. Res. Dev., 1960, vol. 4, pp. 66-82.
Wigger, "Cooperation on the Multiple-Access Channel", thesis, Sep. 18, 2008, 242 pgs.
Willems, "The maximal-error and average-error capacity region of the broadcast channel are identical: A direct proof", Problems of Control and Information Theory, 1990, vol. 19, No. 4, pp. 339-347.
Wyner, "Recent results in the Shannon Theory", IEEE Transaction on Information Theory, Jan. 1974, vol. IT-20, No. 1, pp. 2-10.
Yamamoto, "Secret sharing system using (k, L, n) threshold scheme", Electronics and Communications in Japan (Part I: Communications), vol. 69, No. 9, Sep. 1986, pp. 46-54.
Yang et al., "A (t, n) multi-secret sharing scheme", Applied Mathematics and Computation, vol. 151, Issue 2, Apr. 5, 2004, pp. 483-490.
Zhang et al., "Threshold changeable secret sharing schemes revisited", Theoretical Computer Science, vol. 418, Feb. 10, 2012, pp. 106-115.

\* cited by examiner

SYSTEMS AND METHODS FOR TRANSMITTING DATA USING ENCODER COOPERATION IN THE PRESENCE OF STATE INFORMATION

CROSS-REFERENCE TO RELATED APPLICATIONS

The present invention claims priority to U.S. Provisional Patent Application Ser. No. 62/507,925 entitled "Cooperation Facilitators in State-Dependent Networks" to Noorzad et al., filed May 18, 2017. The disclosure of U.S. Provisional Patent Application Ser. No. 62/507,925 is herein incorporated by reference in its entirety.

STATEMENT OF FEDERALLY SPONSORED RESEARCH

This invention was made with government support under Grant No(s). CCF1527524 and CCF1526771 awarded by the National Science Foundation. The government has certain rights in the invention.

FIELD OF THE INVENTION

The present invention generally relates to digital communication systems and more specifically to digital communication systems that employ cooperation facilitators.

BACKGROUND

The term "cooperation facilitator" (CF) can be used to describe a device within a network that receives rate-limited information from multiple encoders that share a multiple terminal channel, such as (but not limited to) a multiple access channel (MAC), and sends rate-limited information back to the encoders. After exchanging information the CF, the encoders can transmit their codewords, which are functions of each encoder's message and what it received from the CF, over the channel. In the context of an encoder with multiple antennas (e.g., a MIMO scenario) the encoder is often described as sending multiple codewords (one codeword on each antenna). From an information-theoretic perspective, however, transmissions via multiple antennas in this way is more appropriately considered as transmitting one codeword encompassing the symbols transmitted via the multiple antennas. In this regard, CFs can be utilized to enable an encoder within a MIMO or MISO system to select the codeword to transmit via its multiple antennas. One metric that can be used to evaluate the benefits of using a CF is a metric referred to herein as sum-capacity. The sum-capacity of a network is the maximum amount of information that is possible to transmit over that network. Cooperation gain can be defined as the difference between the sum-capacity of a network with cooperation and the sum-capacity of the same network without cooperation. In certain instances, it can be shown that even a very low rate cooperation between the MAC encoders can vastly increase the total rate that can be delivered through the MAC. The cost of utilizing a CF can be measured as the number of bits the CF shares with the encoders and the benefit as the gain in sum-capacity.

SUMMARY OF THE INVENTION

Systems and methods in accordance with various embodiments of the invention utilize a cooperation facilitator (CF) to obtain cooperation benefits in networks, where the CF can communicate state information between at least some encoders that share a multiple access channel (MAC). In many embodiments, cooperation is achieved using a CF that has access to message and/or network state information. In several embodiments, this new type of CF is utilized within networks in which distributed state information is available at multiple encoders and at least partial or full state information is available at at least one decoder. In many instances, the cooperation gain of coding strategies in accordance with various embodiments of the invention grows faster than any linear function, when viewed as a function of the total number of bits the CF shares with the encoders/transmitters. This means that a small increase in the number of bits shared with the encoders/transmitters can result in a large cooperation gain. Importantly, the use of CFs that can exchange message and/or network state information can result in significant increases in sum capacity for MACs for which the infinite slope phenomenon does not occur using CFs that lack network state information.

It is important to note, that the benefits obtained using a CF are not limited to wireline/wireless communications, but may also include a variety of other areas where information theory is frequently used, such as data storage. It is likewise important to note that increasing sum capacity is not the only potential benefit of cooperation; a variety of other benefits are possible including improved reliability and increased individual rates.

One embodiment of the invention includes: a plurality of transmitters; a receiver that has access to at least partial network state information and that includes a decoder configured to decode signals received via a multiple terminal channel from the plurality of transmitters using the at least partial network state information; and a cooperation facilitator. In addition, at least some of the plurality of transmitters are configured to transmit message information to the cooperation facilitator. Furthermore, the cooperation facilitator is configured to generate cooperation parameters based upon the message information received from the plurality of transmitters and the manner in which the at least partial network state information by the receiver to decode signals received via the multiple terminal channel. In addition, the cooperation facilitator is configured to transmit cooperation parameters to the plurality of transmitters. Additionally, an encoder in at least one of the plurality of transmitters selects at least one codeword from a plurality of codewords based at least in part upon a cooperation parameter received from the cooperation facilitator, and the plurality of transmitters are configured to transmit selected codewords via the multiple terminal channel to the receiver.

In a further embodiment, at least some of the plurality of transmitters have access to at least partial network state information, at least some of the plurality of transmitters are configured to transmit message and network state information to the cooperation facilitator, and the cooperation facilitator is configured to generate cooperation parameters based upon the message and network state information received from the plurality of transmitters.

In another embodiment, selection of at least one codeword from the plurality of codewords by an encoder based at least in part upon a cooperation parameter received from the communication facilitator results in selection of at least one codeword in a manner that is dependent upon network state.

In a still further embodiment, selection of at least one codeword from the plurality of codewords by an encoder based at least in part upon a cooperation parameter received from the communication facilitator results in selection of at least one codeword in a manner that is also dependent upon codewords transmitted by other transmitters via the multiple terminal channel.

In still another embodiment, selection of at least one codeword from the plurality of codewords by an encoder based at least in part upon a cooperation parameter received from the communication facilitator results in selection of at least one codeword in a manner that is also dependent upon message information transmitted to the cooperation facilitator by at least one of the plurality of transmitters.

In a yet further embodiment, a first value of a network performance metric of the communication system achieved using codewords selected at least in part based upon the cooperation parameters received from the cooperation facilitator is greater than a second value of the network performance metric of the communication system achieved where each of the plurality of encoders encodes data without communicating with the cooperation facilitator.

In yet another embodiment, the first value of the network performance metric is a first sum-capacity of the communication system and the second value of the network performance metric is a second sum-capacity of the communication system.

In a further embodiment again, the first value of the network performance metric is a first reliability of the communication system and the second value of the network performance metric is a second reliability of the communication system.

In another embodiment again, at least some of the plurality of transmitters have access to partial network state information.

In a further additional embodiment, the network state information is selected from the group consisting of strictly causal state information and causal state information.

In another additional embodiment, the network state information non-causal.

In a still yet further embodiment, at least some of the plurality of transmitters are configured to transmit message and network state information to the cooperation facilitator while at least one of the plurality of transmitters is transmitting symbols via the multiple terminal channel to the receiver, an encoder in at least one of the plurality of transmitters receives at least one cooperation parameter from the cooperation facilitator while at least one of the plurality of transmitters transmitting symbols via the multiple terminal channel to the receiver, and the encoder that receives the at least one cooperation parameter from the cooperation facilitator selects a next symbol of a codeword based upon the received at least one cooperation parameter.

In still yet another embodiment, at least some of the plurality of transmitters are configured to transmit message and network state information to the cooperation facilitator that is selected from the group consisting of:

partial raw message information and partial raw network state information;

complete raw message information and partial raw network state information;

partial raw message information and complete raw network state information;

complete raw message information and complete raw network state information;

partial encoded message information and partial raw network state information;

complete encoded message information and partial raw network state information;

partial encoded message information and complete raw network state information;

complete encoded message information and complete raw network state information;

partial raw message information and partial encoded network state information;

complete raw message information and partial encoded network state information;

partial raw message information and complete encoded network state information;

complete raw message information and complete encoded network state information;

partial encoded message information and partial encoded network state information;

complete encoded message information and partial encoded network state information;

partial encoded message information and complete encoded network state information; and complete encoded message information and complete encoded network state information.

In a still further embodiment again, the multiple terminal channel is a multiple access channel.

In still another embodiment again, the multiple access channel is a shared wireless channel.

In a still further additional embodiment, the multiple access channel is a Gaussian multiple access channel with binary fading.

In a yet further embodiment again, the plurality of transmitters is two transmitters.

In yet another embodiment again, the plurality of transmitters is at least three transmitters.

In a further additional embodiment again, cooperation parameters are transmitted by the cooperation facilitator by a first channel to the plurality of transmitters separate from the multiple terminal channel.

Another further embodiment includes: a transmitter; a receiver; and a cooperation facilitator controller. In addition, the cooperation facilitator controller is configured to:

receive message information from a plurality of transmitter nodes via the receiver;

generate cooperation parameters based upon the message information received from the plurality of transmitter nodes and the manner in which a receiver node utilizes at least partial network state information to decode signals received via a multiple terminal channel; and transmit cooperation parameters via the transmitter to the plurality of transmitter nodes, where the cooperation parameters enable encoders in each of the plurality of transmitter nodes to select a codeword from a plurality of codewords for transmission in a manner that is dependent upon network state.

In still another further embodiment, the cooperation facilitator controller is configured to:

receive message and network state information from the plurality of transmitter nodes via the receiver;

generate cooperation parameters based upon the message and network state information received from the plurality of transmitter nodes; and transmit cooperation parameters via the transmitter to the plurality of transmitter nodes, where the cooperation parameters enable encoders in each of the plurality of transmitter nodes to select a codeword from a plurality of codewords for transmission in a manner that is dependent upon network state.

In yet another further embodiment, the cooperation facilitator is configured to transmit cooperation parameters to the plurality of transmitter nodes that enable an encoder to select a codeword from a plurality of codewords for transmission in a manner that is dependent upon network state and at least one message transmitted via a multiple terminal channel that is encoded by another encoder.

In another further embodiment again, a first value of a network performance metric of the cooperation facilitator achieved using codewords selected at least in part based upon the cooperation parameters received from the cooperation facilitator is greater than a second value of a network performance metric of the cooperation facilitator achieved with each of the plurality of encoders encodes data without communicating with the cooperation facilitator.

In another further additional embodiment, the first value of the network performance metric is a first sum-capacity of the cooperation facilitator and the second value of the network performance metric is a second sum-capacity of the cooperation facilitator.

In still yet another further embodiment, the first value of the network performance metric is a first reliability of the cooperation facilitator and the second value of the network performance metric is a second reliability of the cooperation facilitator.

In still another further embodiment again, the received network state information is partial network state information.

In still another further additional embodiment, the network state information is selected from the group consisting of strictly causal state information and causal state information.

In yet another further embodiment again, the network state information is non-causal.

In yet another further additional embodiment, the plurality of nodes is two nodes.

In another further additional embodiment again, the plurality of nodes is at least three nodes.

DETAILED DESCRIPTION

Figure 1:
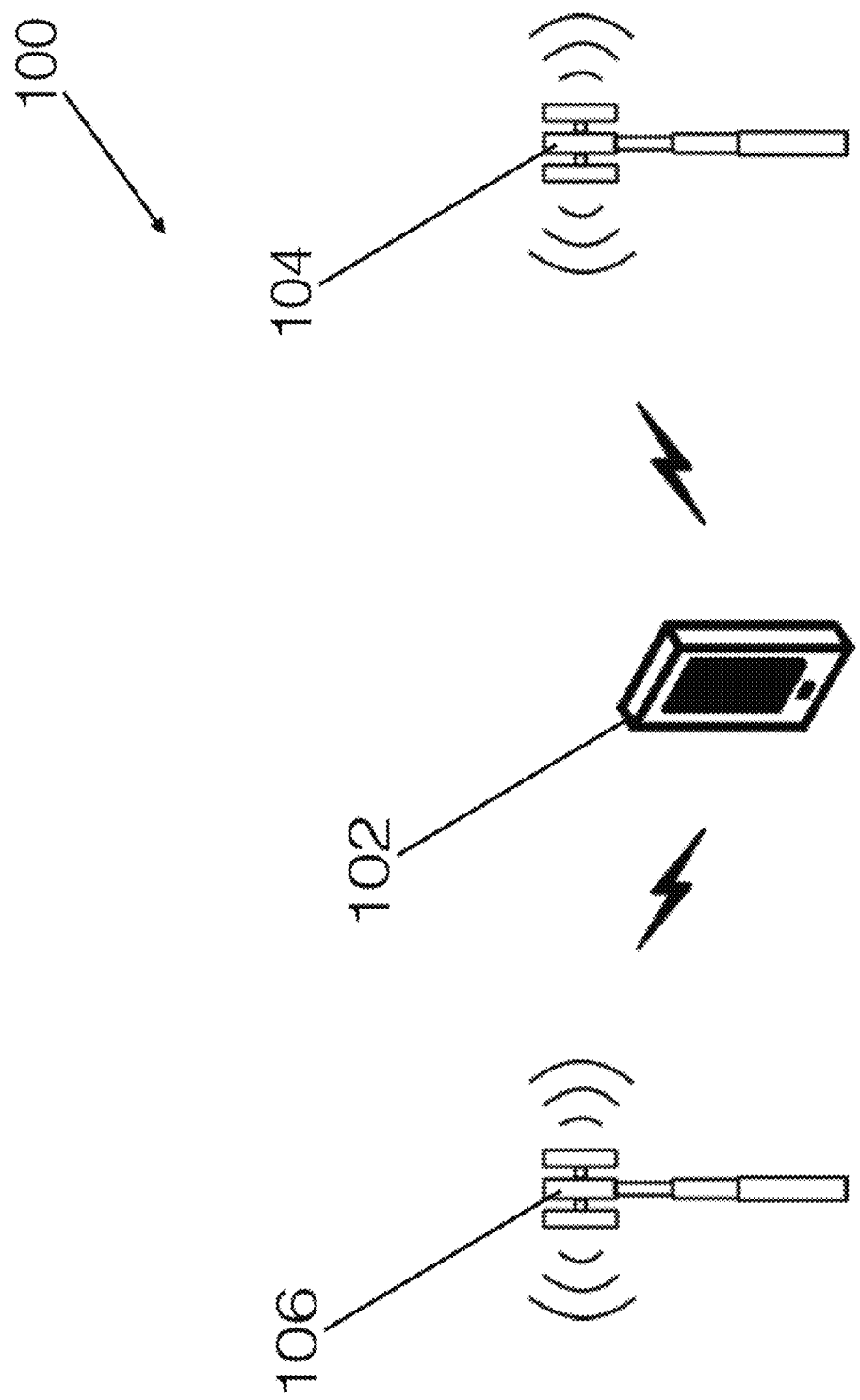
FIG. 1 is a diagram illustrating a system incorporating a cooperation facilitator for at least two other transmitters sharing a multiple access channel in accordance with an embodiment of the invention.

Turning now to the drawings, systems and methods for transmitting data using encoder cooperation based upon shared network state information in accordance with various embodiments of the invention are illustrated. In many embodiments, cooperation between encoders that communicate via a MAC is achieved using a cooperation facilitator. The term cooperation facilitator (CF) can be used to describe any network node that enables other nodes to cooperate. By sharing message information and/or state information via a cooperation facilitator, encoders can work together to increase transmission rates.

The use of cooperation facilitators in the absence of state information is disclosed in U.S. Patent Publication No. 2016/0365940, which details conditions under which the sum-capacity gain of cooperation has an infinite slope in the limit of small cooperation rate. Specifically, U.S. Patent Publication No. 2016/0365940 describes single-letter conditions on the channel transition matrix of the MAC that provide an infinite slope in sum-capacity as a function of the capacities of the CF output edges. For example, the additive Gaussian MAC provides an important example of a scenario where the infinite slope phenomenon can occur in the absence of network state information. The disclosure of U.S. Patent Publication No. 2016/0365940 including the disclosure related to network configurations involving cooperation facilitators that achieve a sum-capacity gain of cooperation that has an infinite slope in the limit of small cooperation rate is incorporated herein by reference in its entirety. Systems and methods in accordance with many embodiments of the invention utilize a new type of CF in network scenarios where distributed state information is available at multiple encoders and at least partial or full state information is available at at least one decoder. Systems and methods in accordance with a number of embodiments communicate via MACS for which the cooperation gain can have an infinite slope in the presence of state information, interestingly, this includes channels for which the infinite slope phenomenon is not observed as arising in the absence of state information. Encoders in accordance with a number of embodiments of the invention can transmit raw message and state information available at the encoders to the CF and/or an encoded version of partial message and/or state information as appropriate to the requirements of a given application. Therefore, references to message and/or state information should be understood as encompassing raw message and/or state information and/or at least partially encoded message and/or state information as appropriate to the requirements of a given application. In a number of embodiments, the channel state information is distributed across encoders; that is, different encoders have potentially different partial channel state information regarding the channel state. In many embodiments, one or more encoders can possess partial channel state information that is the same and/or complete channel state information.

While much of the discussion that follows relates to systems in which two encoders communicate with a cooperation facilitator, in many other embodiments more than two encoders communicate with a cooperation facilitator. In addition, communication can be between multiple transmitters and a single receiver or between multiple transmitters and multiple receivers or between transmitters and/or receivers and devices that are both transmitters and receivers in accordance with various embodiments of the invention. Cooperation facilitators and networks incorporating cooperation facilitators that exchange message and/or network state information (that may be encoded) between encoders that share a MAC in accordance with various embodiments of the invention discussed further below.

Networks with State Information

Many applications involve the use of a network where state information is available to at least some nodes, including (but not limited to) wireless channels with fading, cognitive radios, and computer memory with defects. Depending on the application at hand, channel state information may be either fully available at all network nodes or available in a distributed manner.

Practical application of a CF in a network 100 in which state information is available to at least some nodes is conceptually illustrated in FIG. 1 in which a cell phone handset 102 is shown positioned at the edge of a cell boundary between two cell phone towers 104, 106. In the illustrated embodiment, the transmitters on the downlink channels between each of the cell phone towers 104, 106 and the cell phone handset 102 represent two encoders that can simultaneously transmit to the decoder on the cell phone handset. As can readily be appreciated, a real world cellular telephone network includes many more cellular towers and involves a very large number of MACs and other communication components shared by the cellular subscriber devices that utilize the network. However, the example shown in FIG. 1 is illustrative of the potential for a CF placed within a network such as (but not limited to) the illustrated cell phone network can receive message and/or state information from multiple transmitters within the network and use this information to facilitate cooperation between the transmitters. In this way, the CF can facilitate the transmitters transmitting in ways that work well together instead of creating interference. Cooperation strategies can be as simple as time division multiplexing the transmitted signals so that they don't interfere with each other and can extend to more complex strategies including (but not limited to) providing the encoders with cooperation parameters that enable the encoding of a message based at least partially upon network state information. In very complex scenarios, a CF can facilitate multiple transmitters cooperating to generate an ad-hoc multiple input multiple output (MIMO) transmission—a signal that neither transmitter could generate alone. As can readily be appreciated, the specific ways in which a CF in accordance with various embodiments of the invention can facilitate cooperation between transmitters that share a MAC is only limited by the requirements of a given communication system.

In a number of embodiments, network state information is available in a distributed manner, such that each node can access a component or a function of the network state sequence. Furthermore, the network state information may be available non-causally, or alternatively, may be subject to causality constraints. For example, when state information models fading effects experienced during wireless communication, the transmitters' knowledge of network state information can be strictly causal or causal. On the other hand, when the network state sequence models a signal that the transmitter sends to another receiver, then the state sequence is available non-causally at the transmitter.

While cooperation facilitation based upon message and/or network state information is discussed above with respect to a variety of examples, the applications in which CFs in accordance with various embodiments of the invention be utilized are not limited to any specific example. Indeed, CFs can be utilized in a variety of other circumstances including (but not limited to) multiple cell phone handsets transmitting on a congested MAC (e.g., at a stadium or crowded public event) and/or multiple radios on a cell phone handset transmitting via different networks (e.g., 5G and WiFi). Particular characteristics of CFs and channels in which use of CFs can achieve increases in capacity, reliability and/or performance in accordance with several embodiments of the invention are discussed further below.

Cooperation Facilitates in Networks with State Information

The presence of distributed state information in a network can provide an opportunity for cooperation. In many embodiments, cooperation between network nodes such as (but not limited to) encoders that share a MAC is achieved using a CF. In this network architecture, encoders can cooperate indirectly, rather than directly. The CF can enable both message and network state cooperation, which can prove crucial to the cooperation gain obtained through the activities of the CF within the network.

Figure 2:
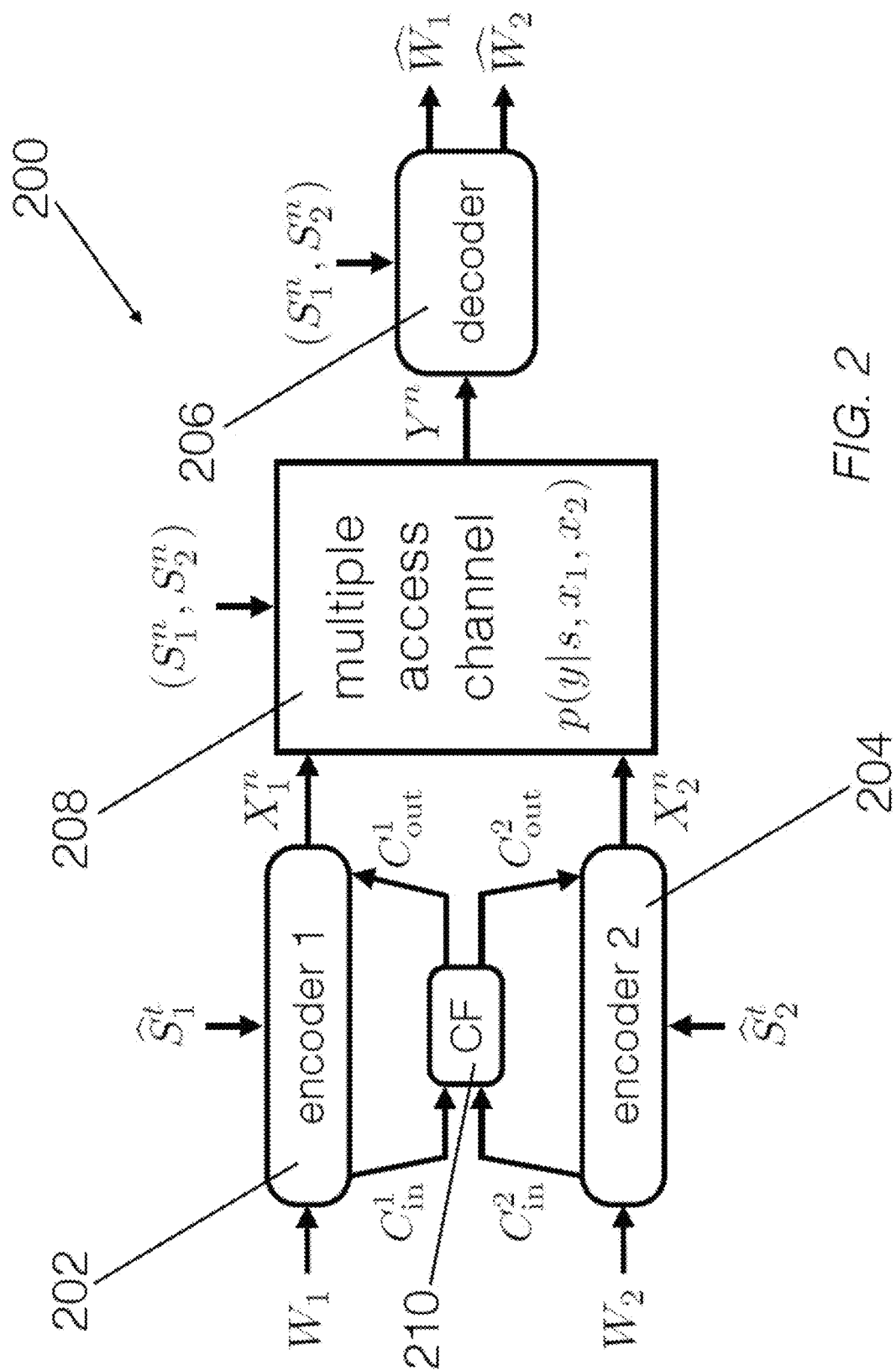
FIG. 2 is a diagram illustrating a cooperation facilitator system exchange message and network state information with multiple encoders/transmitters that share a multiple access channel in accordance with an embodiment of the invention.

A network 200 incorporating a CF that receives message and/or network state information from multiple encoders that share a MAC in accordance with an embodiment of the invention is illustrated in FIG. 2. In the illustrated embodiment, a pair of encoders 202, 204 communicate with a decoder 206 via a state-dependent MAC 20. Communications between the encoders 202, 204 and the decoder 206 as facilitated by a CF 210.

In the illustrated embodiment, the state information available at the encoders 202, 204 is distributed; that is, $S=(S_1,S_2)$ is assumed, where for $i\in\{1,2\}$, $S_i$ is available at encoder i. Throughout the discussion that follows, no assumptions are made regarding the dependence between $S_1$ and $S_2$ and the results apply to the limiting cases of independent states (i.e., independent $S_1$ and $S_2$) and common state (i.e., $S_1=S_2$).

Since the decoder starts the decoding process only after receiving all the output symbols in a given transmission block, causality constraints at the decoder do not impose limitations on the availability of network state information. Thus the decoder can be assumed to have at least partial, full state information, or no state information. In the illustrated embodiment, full state information is available at the decoder. At time $t\in[n]$, partial state information $\hat{S}_i^t$ is available encoder $i\in\{1,2\}$.

In order to analyze the network 100, $S_1$, $S_2$, $X_1$, $X_2$, and $\mathcal{Y}$ can be modeled as discrete or continuous alphabets. A MAC with input alphabet $X_1 \times X_2$, output alphabet $\mathcal{Y}$, and state alphabet $S:=S_1 \times S_2$ can be represented by the sequence $$\{p(s^n)p(y^n\mid s^n, x_1^n, x_2^n)\}_{n=1}^{\infty}.$$

The MAC is said to be memoryless and stationary if for some $p(s)p(y|s,x_1,x_2)$ and all positive integers n.

$$p(s^n)p(y^n\mid s^n, x_1^n, x_2^n) = \prod_{t=1}^{n} p(s_t)p(y_t\mid s_t, x_{1t}, x_{2t}).$$

Comparison Between Message Only and Message and Network State Cooperation

The capacity region of a MAC with a CF that enables message cooperation can be defined with respect to four scenarios based on the availability of state information at the encoders: (i) no state information, (ii) strictly causal state information, (iii) causal state information, and (iv) non-causal state information. In case (i), the CF is used for sharing message information (a strategy here called "message cooperation") since no state information is available at the encoders. The term strictly causal state information refers to the situation in which at each time t, to the extent that an encoder has access to state information, the encoder has access to state information only up to time t−1. The term "causal state information" refers to the situation in which at each time t, to the extent that an encoder has access to state information, the encoder has access to state information only up to time t. The term "non-causal state information" refers to the situation in which, to the extent that an encoder has access to state information, at each time t the encoder has access to state information of all times. In cases (ii)-(iv), the CF enables both message and state cooperation. The discussion that follows considers message and state cooperation only in case (iv), but it can readily be appreciated that message and state cooperation can be utilized in these other scenarios. Use of joint message and state cooperation can lead to a weaker sufficient condition an infinite-slope gain compared to the sole use of message cooperation. Whether in cases (ii) and (iii), the use of joint message and state cooperation likewise leads to a weaker sufficient condition for an infinite-slope gain compared to message cooperation alone, remains an open problem. The impact of cooperation based upon joint message and network state information in accordance with various embodiments of the invention discussed further below.

Referring again to FIG. 2, full state information is assumed available at the decoder 206 (although decoders in marry embodiments only have access to partial state information). In the definition below, for any real number $x \geq 1$, $[x]$ denotes the set $\{1, \ldots, \lfloor x \rfloor\}$.

A $(2^{nR_1}, 2^{nR_2}, n)$-code can be defined for the MAC 208 with $(C_{in}, C_{out})$-CF, cost functions $b_i: X_i \to \mathbb{R}_{\geq 0}$ for $i \in \{1,2\}$, and cost constraints $B_1, B_2 \geq 0$. The pairs $C_{in} = (C_{in}^1, C_{in}^2)$ and $C_{out} = (C_{out}^1, C_{out}^2)$ denote the CF input and output channel capacities, respectively.

Each encoder i, for $i \in \{1,2\}$ (202, 204), can be represented by $(\varphi_{in}^i, (f_{it})_{t=1}^n)$, the CF 210 can be represented by $(\varphi_{out}^1, \varphi_{out}^2)$ and the decoder 206 can be represented by g. These mappings are defined in the order of their use below.

For $i \in \{1,2\}$, the transmission from encoder i (202, 204) to the CF 210 can be represented by the mapping $$\varphi_{in}^i : [2^{nR_i}] \to [2^{nC_{in}^i}] \tag{1}$$

and the transmission from the C 210 to encoder i (202, 204) can be represented by $$\varphi_{out}^i : [2^{nC_{in}^1}] \times [2^{nC_{in}^2}] \to [2^{NC_{out}^i}].$$

For simplicity, the transmissions to and from the CF 210 are assumed to occur prior to the transmission of codewords over the MAC 208 by the encoders 202, 204.

At time $t \in [n]$, for $i \in \{1,2\}$, the transmission of encoder i (202, 204) over the channel 208 can be represented by the mapping $$f_{it} : [2^{nR_i}] \times [2^{nC_{out}^i}] \times \hat{S}_i^t \to X_i. \tag{2}$$

Here $\hat{S}_i^t$ represents any knowledge about the state gathered by encoder i (202, 204) in times $\{1, \ldots, t\}$. Let * be a symbol not in $S_1 \cup S_2$. For $i \in \{1,2\}$ and $t \in [n]$, we have $$\hat{S}_{it} := \begin{cases} * & \text{no state information} \\ S_{i(t-1)} & \text{strictly causal} \\ S_{it} & \text{causal} \\ S_i^n & \text{non-causal.} \end{cases}$$

For every message pair $(w_1, w_2)$, the codeword of encoder i (202, 204) can be required to satisfy the cost constraint $$\sum_{t=1}^n \mathbb{E} b_i [f_{it}(w_i, \varphi_{out}^i(\varphi_{in}^1(w_1), \varphi_{in}^2(w_2)), \hat{S}_i^t)] \leq B_i. \tag{3}$$

As noted above, the decoder 206 is assumed to have full state information and can be represented by the mapping $$g : S^n \times \mathcal{Y}^n \to [2^{nR_1}] \times [2^{nR_2}].$$

The average probability of error is given by $$P_e^{(n)} = Pr\{g(S^n, Y^n) \neq (W_1, W_2)\},$$

where $(W_1, W_2)$ is uniformly distributed over $[2^{nR_1}] \times [2^{nR_2}]$. A rate pair $(R_1, R_2)$ is achievable if there exists a sequence of $(2^{nR_1}, 2^{nR_2}, n)$-codes with $P_e^{(n)} = 0$ as $n \to \infty$.

The subscript $\tau \in \{0, T-1, T, \infty\}$ can be used to specify the dependence of the capacity region and sum-capacity on the availability of state information at the encoders 202, 204. The following table makes this dependence clear.

| $\tau$ | encoder state information |
|---|---|
| 0 | none |
| T − 1 | strictly causal |
| T | causal |
| ∞ | non-causal |

The capacity region $\mathscr{C}_\tau(C_{in}, C_{out})$ can be given by the closure of all achievable rate pairs. The sum-capacity, denoted by $C_\tau(C_{in}, C_{out})$, can be defined as $$C_\tau(C_{in}, C_{out}) := \max_{\mathscr{C}_\tau(C_{in}, C_{out})} (R_1 + R_2). \tag{4}$$

For example, $\mathscr{C}_T(C_{in}, C_{out})$ and $C_T(C_{in}, C_{out})$ denote the capacity region and sum-capacity, respectively, of a MAC with a $(C_{in}, C_{out})$-CF and distributed causal state information available at the encoders.

Message and State Cooperation

In the scenario where non-causal state information is available at the encoders, a CF in accordance with various embodiments of the invention can generate benefits within the network through joint message and state cooperation. A code for the case where non-causal state information is available at the encoders, for $i \in \{1,2\}$ can be defined by replacing (1) and (3) above with $$\varphi_{in}^i : [2^{nR_i}] \times S_i^n \to [2^{nC_{in}^i}], \text{ and}$$

$$\sum_{t=1}^n \mathbb{E} b_i [f_{it}(w_i, \varphi_{out}^i(\varphi_{in}^1(w_1, S_1^n), \varphi_{in}^2(w_2, S_2^n)), S_i^n)] \leq B_i.$$

The capacity region and sum-capacity can be denoted with $\mathscr{C}_{\infty,s}(C_{in}, C_{out})$ and $C_{\infty,s}(C_{in}, C_{out})$, respectively. The subscript "s" indicates the dependence of the cooperation strategy on the channel state information.

Coding Strategy

In a number of embodiments, coding strategies are utilized to encode data at multiple encoders that are based on random coding arguments. Since the aim, in many instances, is to determine conditions sufficient for an infinite slope cooperation gain, coding strategies can be used that specifically focus on achieving large gains for small cooperation rates. In particular, in the coding strategies discussed below, the CF does not simply use its rate for forwarding message or state information, since the gain of such a strategy is understood to be at most linear in the cooperation rate. Instead, more complex cooperation strategies involving the forwarding of cooperation parameters that achieve sum-capacity gains are considered. The analysis presented below first considers message cooperation and concludes with a discussion of message and state cooperation.

Inner Bounds for Message Cooperation

Referring again to FIG. 2, in some embodiments the CF 210 can be assumed to have access to both messages by setting $C_{in}=C^*_{in}=(C^{*1}_{in},C^{*2}_{in})$, where $C^{*1}_{in}$ and $C^{*2}_{in}$ are sufficiently large. In other embodiments, $C_{in}$ may be any positive vector ($C_{in} \in \mathbb{R}^2_{>0}$). The main result regarding sum-capacity gain, Theorem 6, holds for any $C_{in} \mathbb{R}^2_{>0}$, whether or not $C_{in}=C^*_{in}$. This is proven by proving the result for $C_{in}=C^*_{in}$ and then using time-sharing, as stated in the lemma below, to obtain inner bounds for any $C_{in} \mathbb{R}^2_{>0}$, from inner bounds for $C^*_{in}$. The relevant proof for this lemma appears in U.S. Provisional Patent Application Ser. No. 62/507,925, the relevant disclosure from which is incorporated herein by reference in its entirety.

Lemma 1.

Consider a memoryless stationary MAC. For any $(C_{in}, C_{out}) \in \mathbb{R}^2_{>0} \times \mathbb{R}^2_{\geq 0}$, there exists $\mu > 0$, depending only on $C_{in}$, such that for all $\tau \in \{0, T-1, T, \infty\}$, $$C_\tau(C_{in},C_{out}) - C_\tau(C_{in},0) \geq \mu(C_\tau(C^*_{in},C_{out}) - C_\tau(C^*_{in},0)).$$

The inner bound can be described for the case There the encoders 202, 204 do not have access to state information. In this case, even though the decoder 210 has access to full state information, a suitable inner bound can be found by applying results where state information is absent at both the encoders 202, 204 and the decoder 210 to a modified channel.

Specifically, applying the following description of the channel from US Patent Publication No. 2016/0365940 and entitled "Communication Systems and Methods of Communicating Utilizing Cooperation Facilitators" to Noorzad et al.

$$(X_1 \times X_2, p(y,s|x_1,x_2), \mathcal{Y} \times S),$$

where $$p(y,s|x_1,x_2) = p(s)p(y|s,x_1,x_2),$$

gives an inner bound for the channel $p(y|s,x_1,x_2)$ when full state information is available at the decoder. The relevant disclosure from US Patent Publication No. 2016/0365940 is hereby incorporated by reference in its entirety. Applying Lemma 2 together with the outer bound presented in the section "Outer Bounds in the Absence of Cooperation" below gives the capacity region in the absence of cooperation ($C_{out}=0$) both in the case where no network state information is available at the encoders 202, 204 and in the case where the state information available at the encoders 202, 204 is strictly causal.

Lemma 2.

The set of all rate pairs $(R_1,R_2)$ satisfying $$R_1 \leq I(X_1;Y|S_1,S_2,X_2)$$

$$R_2 \leq I(X_2;Y|S_1,S_2,X_1)$$

$$R_1+R_2 \leq I(X_1,X_2;Y|S_1,S_2)$$

for some distribution $p(x_1)p(x_2)$ with $$I(X_1;X_2) \leq C^1_{out}+C^2_{out}$$

and $\mathbb{E}[b_i(X_i)] \leq B_i$ for $i \in \{1,2\}$, is contained in $\mathscr{C}_0(C^*_{in}, C^*_{out})$.

In the case where the encoders 202, 204 have access to causal state information, the codeword transmitted by an encoder can depend both on its message and the present state information. Lemma 3 provides an inner bound for the capacity region in this scenario. In this inner bound, for $i \in \{1,2\}$, $U_i$ encodes the message of encoder i (202, 204) in addition to the information it receives from the CF 210. Note that this inner bound is tight when $C_{out}=0$, even if non-causal state information is available at the encoders 202, 204. As is discussed further below, $X_1$ and $X_2$ can be chosen to be deterministic functions of $(U_1,S_1)$ and $(U_2,S_2)$, respectively. A proof of this lemma can be found in U.S. Provisional Patent Application Ser. No. 62/507,925, the disclosure of which is incorporated by reference in its entirety above.

Lemma 3.

The set of all rate pairs satisfying $$R_1 \leq I(U_1;Y|S_1,S_2,U_2)$$

$$R_2 \leq I(U_2;Y|S_1,S_2,U_1)$$

$$R_1+R_2 \leq I(U_1,U_2;Y|S_1,S_2)$$

for some distribution $p(u_1,u_2)p(x_1|u_1,s_1)p(x_2|u_2,s_2)$ with $$I(U_1;U_2) \leq C^1_{out}+C^2_{out}$$

and $\mathbb{E}[b_i(X_i)] \leq B_i$ for $i \in \{1,2\}$, is contained in $\mathscr{C}_T(C^*_{in}, C^*_{out})$.

Inner Bound Message and State Cooperation

As discussed above, message and state cooperation can be considered in the scenario where non-causal state information is available at the encoders 202, 204. In some embodiments, the assumption can be made that the state alphabet $S=S_1 \times S_2$ is discrete and $H(S_1,S_2)$ is finite. Furthermore, in several embodiments, the CF 210 can be assumed not only to have access to both messages, but also to know the state sequences $S_1^n$ and $S_2^n$; equivalently, in a number of embodiments the assumption can be made that $C_{in}=\bar{C}_{in}=(\bar{C}^1_{in},\bar{C}^2_{in})$, where $\bar{C}^1_{in}$ and $\bar{C}^2_{in}$ are sufficiently large. A lemma analogous to Lemma 1 holds in this case.

Lemma 4.

Fix a memoryless stationary MAC. For any $(C_{in},C_{out}) \in \mathbb{R}^2_{>0} \times \mathbb{R}^2_{\geq 0}$, there exists $\mu>0$, depending only on $C_{in}$, such that $$C_{(\infty,s)}(C_{in},C_{out}) - C_{(\infty,s)}(C_{in},0) \geq \mu(C_{(\infty,s)}(\bar{C}_{in},C_{out}) - C_{(\infty,s)}(\bar{C}_{in},0)),$$

A coding strategy for the MAC can also be developed assuming message and state cooperation. In some embodiments, the code is designed using a random code design algorithm as follows.

Codebook Generation.

Choose a distribution $p(x_1,x_2|s_1,s_2)$. For $i \in \{1,2\}$, $w_i \in [2^{nR_i}]$, $z_i \in [2^{nC^i_{out}}]$, $s_i^n \in S_i^n$, generate $X_i^n(w_i,z_i|s_i^n)$ i.i.d. according to the distribution $$Pr\{X_i^n(w_i, z_i \mid s_i^n) = x_1^n \mid S_i^n = s_i^n\} = \prod_{t=1}^{n} p(x_{it} \mid s_{it}).$$

Encoding.

In some embodiments, the CF 210, having access to $(w_1,w_2)$ and $(S_1^n,S_2^n)$, looks for a pair of cooperation parameters $(Z_1,Z_2) \in [2^{nC^1_{out}}] \times [2^{nC^2_{out}}]$ satisfying $$(S_1^n,S_2^n,X_1^n(w_1,Z_1|S_1^n),X_2^n(w_2,Z_2|S_2^n)) \in A_\delta^{(n)}, \quad (5)$$

where $A_\delta^{(n)}$ is the weakly typical set with respect to the distribution $p(s_1,s_2)p(x_1,x_2|s_1,s_2)$. If there is more than one such pair, in several embodiments the CF can choose the smallest pair according to the lexicographical order. If there is no such pair, it can set the cooperation parameters $(Z_1,Z_2)=(1,1)$. The CF can send $Z_i$ to encoder i for $i \in \{1,2\}$. Encoder i can then transmit $X_i^n(w_i,Z_i|S_i^n)$ over n uses of the channel.

Using lemma. A.1.1 on p. 130 of P. Noorzad, Network effects in small networks: A study of cooperation, Ph.D. dissertation, California Institute of Technology, 2017, the disclosure of which including (but not limited to) the disclosure of lemma A.1.1. is hereby incorporated by reference in its entirety, it follows that as n goes to infinity, the probability that a pair $(Z_1,Z_2)$ satisfying (5) exists goes to one if $$C_{out}^1 > H(X_1|S_1) - H(X_1|S_1,S_2) + 24\delta$$

$$C_{out}^2 > H(X_2|S_2) - H(X_2|S_1,S_2) + 24\delta$$

$$C_{out}^1 + C_{out}^2 > H(X_1|S_1) + H(X_2|S_2) - H(X_1,X_2|S_1,S_2) + 6\delta.$$

Decoding.

Once the decoder 206 receives $Y^n$, using $(S_1^n,S_2^n)$, in several embodiments it can look for a pair $(\hat{w}_1,\hat{w}_2)$ that satisfies $$(S_1^n,S_2^n,X_1^n(\hat{w}_1,\hat{Z}_1|S_1^n),X_2^n(\hat{w}_2,\hat{Z}_2|S_2^n),Y^n) \in A_\epsilon^{(n)}.$$

Here $A_\epsilon^{(n)}$ is the weakly typical set with respect to the distribution $$p(s_1,s_2)p(x_1,x_2|s_1,s_2)p(y|s_1,s_2,x_1,x_2).$$

If there is no such pair, or there is such a pair but it is not unique, in a number of embodiments the decoder can set $(\hat{w}_1,\hat{w}_2)=(1,1)$.

The error analysis of the above coding scheme leads to the following lemma, which provides an inner bound for $\mathscr{C}_{\infty,s}(\overline{C}_{in},C_{out})$.

Lemma 5.

The set of all rate pairs satisfying $$R_1 \leq I(X_1;Y|S_1,S_2,X_2)$$

$$R_2 \leq I(X_2;Y|S_1,S_2,X_1)$$

$$R_1+R_2 \leq I(X_1,X_2;Y|S_1,S_2)$$

for some distribution $p(x_1,x_2|s_1,s_2)$ with $$C_{out}^1 \leq H(X_1|S_1) - H(X_1|S_1,S_2)$$

$$C_{out}^2 \leq H(X_2|S_2) - H(X_2|S_1,S_2)$$

$$C_{out}^1 + C_{out}^2 \geq H(X_1|S_1) + H(X_2|S_2) - H(X_1,X_2|S_1,S_2)$$

and $\mathbb{E}[b_i(X_i)] \leq B_i$ for $i \in \{1,2\}$, is contained in $\mathscr{C}_{\infty,s}(\overline{C}_{in},C_{out})$.

Multiple Access Channels that Experience Sum-capacity Gains Using Cooperation Facilitators In light of the inner and outer bounds described above with respect to different availability of network state information and/or type of network state information, the following discussion identifies conditions on a MAC that, if satisfied, for every fixed $C_{in} \in \mathbb{E}_{>0}^2$, guarantee an infinite slope in sum-capacity as a function of $C_{out}$. As sum-capacity depends on the availability of state formation at the encoders 202, 204, so do the identified conditions. These conditions, here denoted by $C_\tau(S,X_1,X_2,\mathscr{Y})$ are described in the sections below.

Theorem 6.

Let $S$, $X_1$, $X_2$, and $\mathscr{Y}$ be finite sets. For any $\tau \in \{0,T-1, T,\infty,(\infty,s)\}$, any MAC in $C_\tau(S,X_1,X_2,\mathscr{Y})$, and any $(C_{in},v) \in \mathbb{R}_{>0}^2 \times \mathbb{R}_{>0}^2$, $$\lim_{h \to 0^+} \frac{C_\tau(C_{in},hv) - C_\tau(C_{in},0)}{h} = \infty.$$

The relevant proof for the above theorem appears in U.S. Provisional Patent Application Ser. No. 62/507,925, the relevant disclosure from which is incorporated herein by reference in its entirety.

$C_\tau(S,X_1,X_2,\mathscr{Y})$ can be specifically defined for each subscript $\tau \in \{0,T-1,T,\infty,(\infty,s)\}$, where $\tau$ specifies the availability of state information at the encoders. Note that the definition of $C_\tau$ provides sufficient conditions for a large cooperation gain; these conditions may not be necessary.

In the descriptions below, all mentioned distributions satisfy $$\mathbb{E}[b_i(X_i)] \leq B_i \text{ for } i \in \{1,2\}.$$

Non-CSI Cooperation

A number of classes of MACs, which exhibit a large message cooperation gain as described in Theorem 6, can be identified. In many embodiments, systems that operate with respect to these classes of MACs employ non-CSI (Channel-State-Information) cooperation.

No State Information.

A MAC is in $C_0(S,X_1,X_2,\mathscr{Y})$ if (i) for some $p_0(x_1)p_0(x_2)$ that satisfies $$I_0(X_1, X_2; Y | S) = \max_{p(x_1)p(x_2)} I(X_1, X_2; Y | S),$$

there exists $p_1(x_1,x_2)$ that satisifes $$I_1(X_1,X_2;Y|S) + \mathbb{E}[D(p_1(y|S)\|p_0(y|S))] > I_0(X_1,X_2;Y|S);$$
and (ii) $\text{supp}(p_1(x_1,x_2)) \subseteq \text{supp}(p_0(x_1)p_0(x_2))$, where "supp" denotes the support.

Intuitively, condition (i) ensures that a channel has the property that the dependence created through message cooperation increases sum-capacity. Condition (ii) allows the CF 210 to use a small rate (i.e., small $C_{out}$) to help the encoders 202, 204, whose codewords are generated according to $p_0(x_1)p_0(x_2)$, to transmit codewords whose distribution is sufficiently close to $p_1(x_1,x_2)$ to achieve a large gain in sum-capacity.

Strictly Causal State Information.

As mentioned above, the availability of strictly causal state information at the encoders of a MAC without cooperation does not enlarge the capacity region, thus $C_{T-1}(S,X_1,X_2,\mathscr{Y}):=C_0(S,X_1,X_2,\mathscr{Y})$.

Causal State Information.

A MAC is in $C_T(S,X_1,X_2,\mathscr{Y})$ if (i) for some $p_0(x_1|s_1)p_0(x_2|s_2)$ that satisfies $$I_0(X_1, X_2; Y | S) = \max_{p(x_1|s_1)p(x_2|s_2)} I(X_1, X_2; Y | S),$$

there exists alphabets $\mathcal{U}_1$, $\mathcal{U}_2$, distributions $p_0(u_1)p_0(u_2)$ and $p_1(u_1,u_2)$, and mappings $f_i: \mathcal{U} \times S_i \to X_i$ for $i \in \{1, 2\}$ such that $$p_0(x_1|s_1)p_0(x_2|s_2) = \sum_{u_1,u_2} p_0(u_1)p_0(u_2)\mathbf{1}\{x_1 = f_1(u_1,s_1)\}\mathbf{1}\{x_2 = f_2(u_2,s_2)\}, \quad (6)$$

$$I_1(U_1, U_2; Y | S) + \mathbb{E}[D(p_1(y|S)\|p_0(y|S))] > I_0(U_1, U_2; Y | S), \quad (7)$$
and (ii) $\text{supp}(p_1(u_1, u_2)) \subseteq \text{supp}(p_0(u_1)p_0(u_2)).$ In (7), the expressions are calculated using the input distributions $$p_0(u_0)p_0(u_2)1\{x_1=f_1(u_1,s_1)\}1\{x_2=f_2(u_2,s_2)\}, \text{ and}$$

$$p_1(u_1,u_2)1\{x_1=f_1(u_o,s_1)\}1\{x_2=f_2(u_2,s_2)\}.$$

Non-Causal State Information.

In the absence of cooperation, the capacity region is the same regardless of whether the state information at the encoders is causal or non-causal. Thus, similar to the strictly causal case, $C_\infty(S,X_1,X_2,\mathcal{Y}):=C_T(S,X_1,X_2,\mathcal{Y})$.

CSI Based Cooperation

Conditions can be expressed that are sufficient for a CF to achieve a large gain using joint message and state cooperation.

Non-Causal State Information.

A MAC is in $C_{\infty,s}(S,X_1,X_2,\mathcal{Y})$ if
(i) for some $p_0(x_1|s_1)p_0(x_2|s_2)$ that satisfies $$I_0(X_1, X_2; Y|S) = \max_{p(x_1|s_1)p(x_2|s_2)} I(X_1, X_2; Y|S),$$

there exists $p_1(x_1,x_2|s_1,s_2)$ that satisfies $$I_1(X_1,X_2;Y|S) + \mathbb{E}[D(p_1(y|S)\|p_0(y|S))] > I_0(X_1,X_2;Y|S),$$
and (ii) for all $(s_1,s_2)\in S$, $\text{supp}(p_1(x_1,x_2|s_1,s_2))\subseteq\text{supp}(p_0(x_1|s_1)p_0(x_2|s_2))$.

Example: Gaussian MAC with Binary Fading

While Theorem 6 is stated only for finite alphabet MACs, the esu is not limited to such MACs. Specifically, for a given MAC, the inner bounds described above can be used to calculate an inner bound for sum-capacity and verify be result of Theorem 6 directly.

Assume for example, that the MAC 208 in FIG. 2 represents wireless communication between the two encoders 202, 204 and the decoder 206 in the presence of binary fading. The input-output relationship of this MAC 208 can be given by $$Y = S_1 X_1 + S_2 X_2 + Z,$$

where $(S_1, S_2)$ is uniformly distributed on $\{0,1\}^2$, and $Z$ is a Gaussian random variable with mean zero and variance N. In addition, for $i\in\{1,2\}$ the cost function can be set to $b_i(x)=x^2$ subject to the cost constraint $B_i=P_i$, so that the cost constraints correspond to the usual power constraints of the Gaussian MAC.

Proposition 7.

Consider the Gaussian MAC with binary fading. Fix $(C_{in},v)\in\mathbb{R}_{>0}^2 \times \mathbb{R}_{>0}^2$. Then for all $\tau\in\{0,T-1,T,\infty,(\infty,s)\}$, $$\lim_{h\to 0^+} \frac{C_\tau(C_{in}, hv) - C_\tau(C_{in}, 0)}{h} = \infty.$$

The relevant proof for the above proposition appears in U.S. Provisional Patent Application Ser. No. 62/507,925, the relevant disclosure from which is incorporated herein by reference in its entirety As the above proposition indicates, the use of a CF that facilitates joint message and network state cooperation can result in an increase in sum-capacity has infinite slope in the iiniit of small cooperation rate. Just as the analysis presented above in the content of the discussion of FIG. 2 establishes that utilization of a CF in a network in which network state is available through joint message and state cooperation can achieve significant benefits in a Gaussian MAC with binary fading, similar analysis can be utilized to demonstrate the benefit of joint message and state cooperation in a variety of MACs and network architectures including (but not limited to) MACs that are shared by more than two encoders. CFs and processes for performing joint message and network state cooperation within a network in which network state information is available in accordance with various embodiments of the invention are discussed further below.

Cooperation Facilitator Controllers

Figure 3:
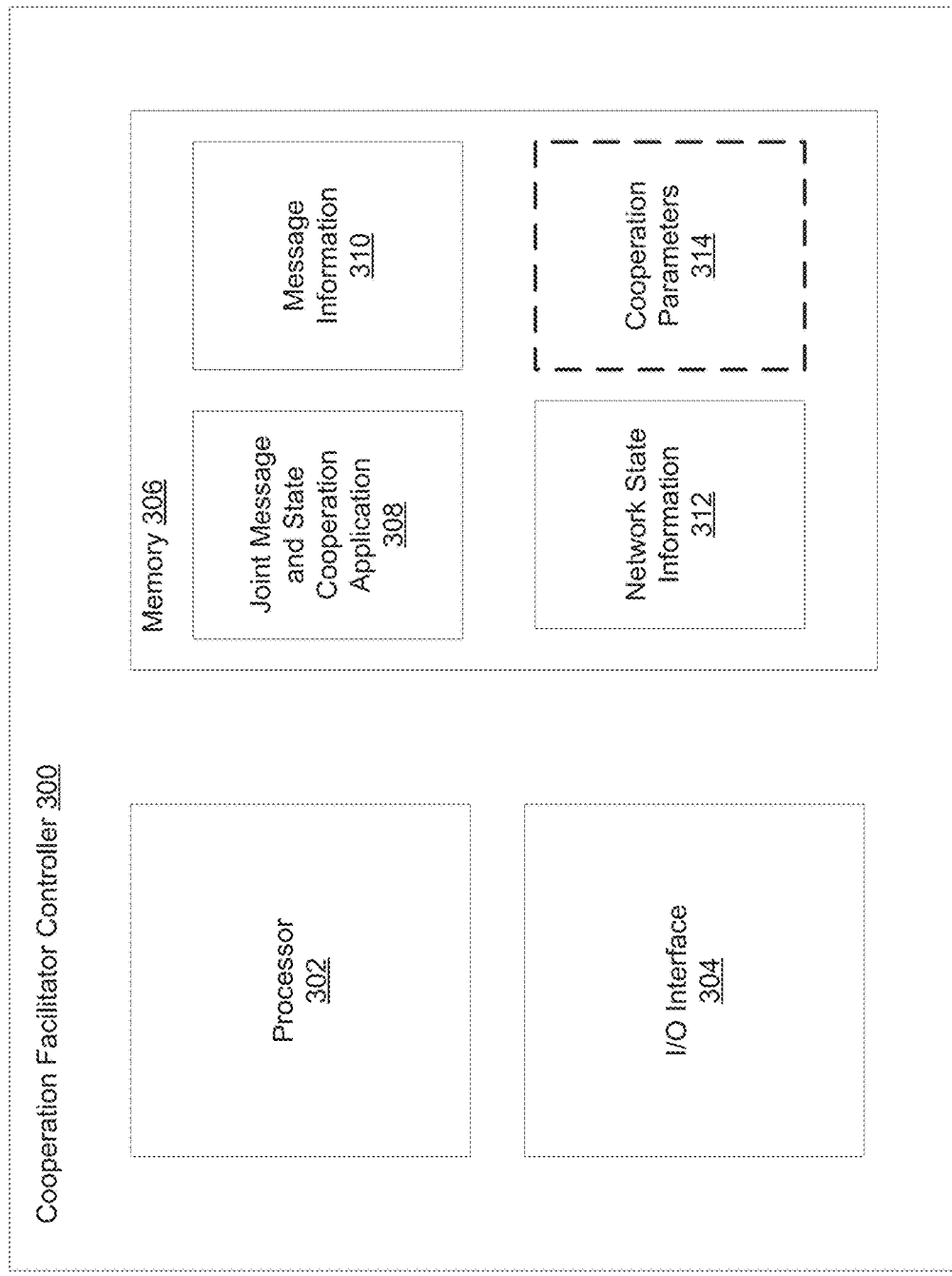
FIG. 3 is a block diagram illustrating a cooperation facilitator controller in accordance with an embodiment of the invention.

Cooperation Facilitator controllers which implement network state based cooperation applications in accordance with many embodiments of the invention are described in FIG. 3. In several embodiments, Cooperation Facilitator (CF) controller 300 can coordinate the transmission of data among nodes in a network to improve performance including rate and/or reliability based upon message and/or network state information received from transmitters utilizing a MAC within the network. The CF controller can include at least one processor 302, an I/O interface 304, and memory 306. In many embodiments, the memory 306 includes software including a joint message and state cooperation application 308, as well as message information 310, network state information 312, and cooperation parameters 312. As noted above, the cooperation parameters are encoded, because simply forwarding message and/or network state information is unlikely to yield an increase in sum-capacity greater than the rate used to send those parameters. Processes that can be utilized to encode cooperation parameters in accordance with various embodiments of the invention are discussed above. As can readily be appreciated, the specific encoding process can depend upon whether the network state information is unavailable, is strictly causal, causal or non-causal and upon the requirements of a specific network.

Although a variety of CF controllers are described above with reference to FIG. 3, any of a variety of CF controllers for implementing joint message and network state cooperation can be utilized as appropriate to the requirements of specific applications in accordance with various embodiments of the invention. Processes for utilizing CFs to achieve joint message and network state cooperation are discussed further below.

Processes for Facilitating Joint Message and Network State Cooperation

Figure 4:
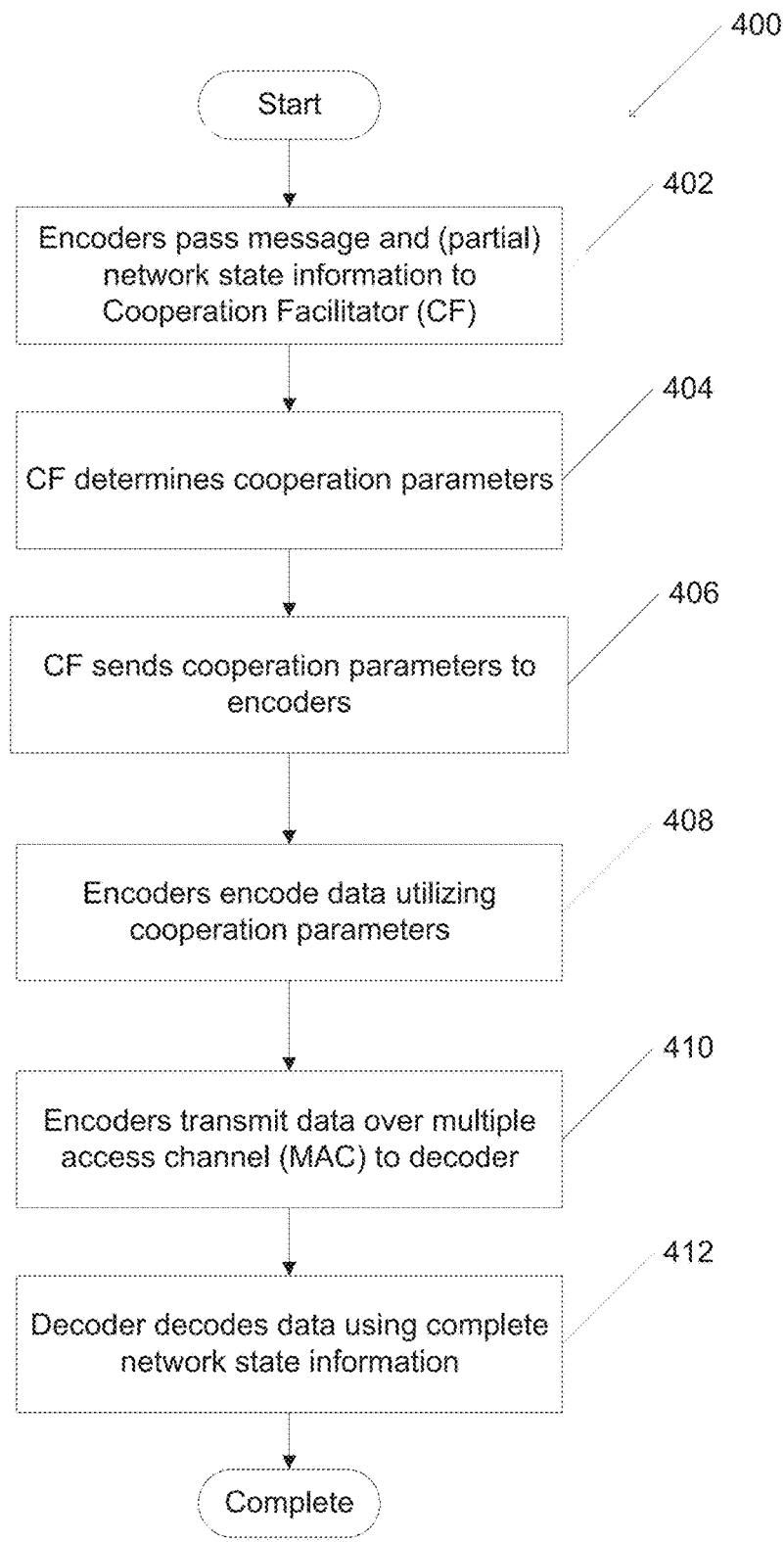
FIG. 4 is a flow chart illustrating a coordinated data transmission process in accordance with an embodiment of the invention.

An overview of a coordinated data transmission process 400 that utilizes a CF to encode cooperation parameters using message and network state information received from multiple transmitters that share a MAC in accordance with several embodiments of the invention is illustrated in FIG. 4. Message and/or at least partial network state information can be passed 402 from encoders to the cooperation facilitator. As noted above, messages received from an encoder can lack any state information or contain strictly causal state information, causal state information, or non-causal state information. Generally, message parameters are part of the messages being encoded by the system. In various embodiments two encoders are utilized. As can readily be appreciated, CFs can also be used with more than two encoders/transmitters. The CF determines 404 cooperation parameters by encoding the message and network state information. The cooperation parameters provided to the encoders enable the encoders to generate code words based both on their own message and the network state. The generation of cooperation parameters is discussed in greater detail below. The CF sends 406 cooperation parameters to encoders. Encoders encode 408 message data utilizing the cooperation parameters in a manner that results in the codewords being selected in a manner that is dependent both upon messages transmitted by other transmitters and network state information. In some embodiments, data is transmitted 410 over a multiple access channel (MAC) to one or more decoders. The decoder decodes 412 the data using network state information and the channel output.

Figure 5:
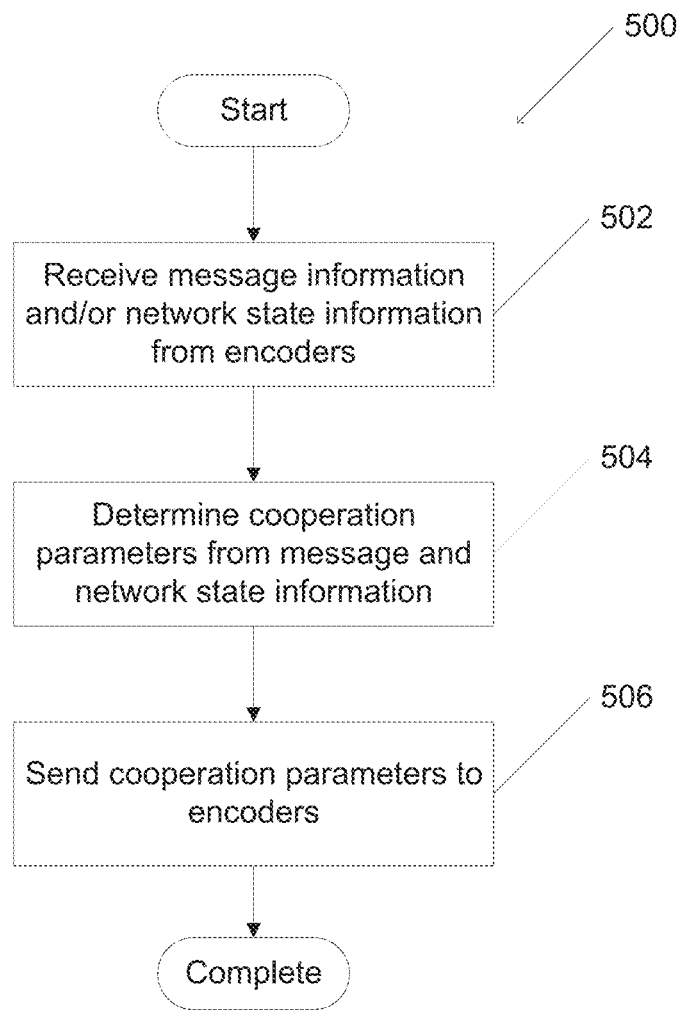
FIG. 5 is a flow chart illustrating cooperation facilitator process in accordance with an embodiment of the invention.

In many embodiments, the use of a CF can improve data transmission. In some embodiments, for example in noisy environments, the rate of data transmission can be increased. In many other embodiments, the reliability of data transmissioncan be increased. Increase in data rate and increase in data reliability will be discussed in further detail below. Although a variety of data transmission processes are described above with reference to FIG. 4, any of a variety of processes for coordinated data transmission that achieve joint message and network state cooperation can be utilized as appropriate to the requirements of specific applications in accordance with embodiments of the invention. Processes that can be utilized by CFs to achieve joint message and network state cooperation in accordance with various embodiments of the invention are discussed further below. Processes for Achieving Joint Message and State Cooperation A process 500 for coordinating joint message and state cooperation that can be performed by a cooperation facilitator node in accordance with an embodiment of the invention is illustrated in FIG. 5. The CF receives 502 at least partial message and at least partial network state information from a number of encoders. Cooperation parameters are determined 504 from the message and network state information. In several embodiments, cooperation parameters are generated by the CF that enable encoders to select codewords that encode user data in a manner that is dependent upon messages transmitted by other transmitters via the MAC and network state information. Stated another way, they enable encoders within a system to create dependence among independently generated codewords, and specifically dependence that is a function of network state. Cooperation parameters are sent 506 to the encoders. In various embodiments, two encoders are utilized. In many embodiments, more than two encoders are utilized.

Although a variety of processes for achieving joint message and network state cooperation are described above with reference to FIG. 5, any of a variety of processes to coordinate cooperation in a data transmission network based upon network state can be utilized as appropriate to the requirements of specific applications in accordance with various embodiments of the invention. Processes for encoding data based upon cooperation parameters are discussed below.

Encoding Processes

Figure 6:
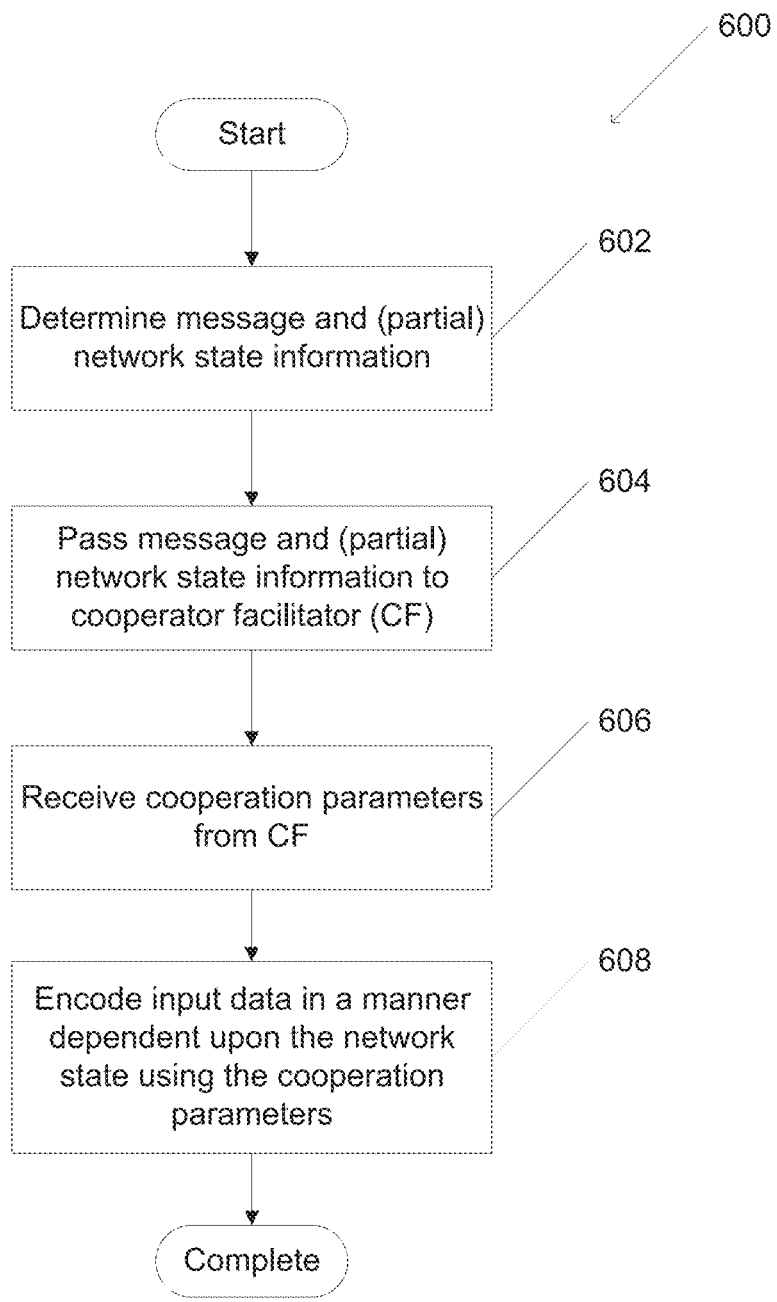
FIG. 6 is a flow chart illustrating an encoding process in accordance with embodiment of the invention.

An encoding process 600 that utilizes data from a CF to select codewords in a manner that makes the codewords dependent upon codewords selected by other encoders sharing a MAC and the network state in accordance with various embodiments of the invention is illustrated in FIG. 6. Data parameters are determined 602 from user data received by the encoder. User or input data generally is the message and/or messages to be encoded. As noted above, encoders can lack any state information or have access to strictly causal state information, causal state information, or non-causal state information. The encoder can pass 604 available message and network state information to a CF, which utilizes the received information in a cooperation facilitator process similar to any of the processes described above with respect to FIG. 5. Cooperation parameters are received 606 from the CF. In several embodiments, coordinating parameters are generated by the CF to enable coordinated data transmission within the system. Input data can be encoded 608 by the encoder using the cooperation parameters. In several embodiments, the cooperation parameters enable the encoder to encode 608 user data in a manner that is dependent upon messages transmitted by other transmitters via the MAC and network state information. As noted above, they enable encoders within a system to create dependence among independently generated codewords.

Although a variety of encoding processes are described above with reference to FIG. 6, any of a number of processes for encoding input data based upon cooperation parameters so that the encoded data is encoded in a manner that is dependent upon network state can be utilized as appropriate to the requirements of specific applications in accordance with various embodiments of the invention. For example, communication between the CF and encoders can happen in parallel with the transmission over the MAC. In many embodiments, the encoders can use a small part of the cooperation rate to communicate with the CF, then send a single symbol over the channel (instead of the entire codeword), then communicate with the CF again before sending their second symbol over the channel, and so on. Accordingly, the processes described herein should not be regarded as limiting and simply illustrative implementations of various embodiments of the invention.

Although the present invention has been described in certain specific aspects, many additional modifications and variations would be apparent to those skilled in the art. For example, the discussion provided above references use of cooperation facilitators in the context of Guassian MACs including binary fading. Cooperation facilitators that achieve joint message and network state cooperation in accordance with various embodiments of the invention can improve network performance in a variety of contexts involving shared resources including (but not limited to) other channel types. Furthermore, although specific techniques for building code books are described above, the processes presented herein can be utilized to generate code books that can be readily implemented in encoders used in typical communication devices to achieve low latency encoding of message data based upon data received from communication facilitators. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A communication system, comprising:
   a plurality of transmitters;
   a receiver that has access to at least partial network state information and that includes a decoder configured to decode signals received via a multiple terminal channel from the plurality of transmitters using the at least partial network state information;
   a cooperation facilitator;
   wherein at least some of the plurality of transmitters are configured to transmit message information to the cooperation facilitator;
   wherein the cooperation facilitator is configured to generate cooperation parameters based upon the message information received from the plurality of transmitters and a manner in which the at least partial network state information is utilized by the receiver to decode signals received via the multiple terminal channel;

wherein the cooperation facilitator is configured to transmit cooperation parameters to the plurality of transmitters;

wherein an encoder in at least one of the plurality of transmitters selects at least one codeword from a plurality of codewords based at least in part upon a cooperation parameter received from the cooperation facilitator; and wherein the plurality of transmitters are configured to transmit selected codewords via the multiple terminal channel to the receiver.

2. The communication system of claim 1, wherein:
at least some of the plurality of transmitters have access to at least partial network state information;
at least some of the plurality of transmitters are configured to transmit message and network state information to the cooperation facilitator; and
the cooperation facilitator is configured to generate cooperation parameters based upon the message and network state information received from the plurality of transmitters.

3. The communication system of claim 2, wherein the selection of at least one codeword from the plurality of codewords by the encoder based at least in part upon the cooperation parameter received from the communication facilitator results in selection of at least one codeword in a manner that is dependent upon network state.

4. The communication system of claim 3, wherein the selection of at least one codeword from the plurality of codewords by the encoder based at least in part upon the cooperation parameter received from the communication facilitator results in selection of at least one codeword in a manner that is also dependent upon codewords transmitted by other transmitters via the multiple terminal channel.

5. The communication system of claim 3, wherein the selection of at least one codeword from the plurality of codewords by the encoder based at least in part upon the cooperation parameter received from the communication facilitator results in selection of at least one codeword in a manner that is also dependent upon message information transmitted to the cooperation facilitator by at least one of the plurality of transmitters.

6. The communication system of claim 2, wherein a first value of a network performance metric of the communication system achieved using codewords selected at least in part based upon the cooperation parameters received from the cooperation facilitator is greater than a second value of the network performance metric of the communication system achieved where each of the plurality of encoders encodes data without communicating with the cooperation facilitator.

7. The communication system of claim 6, wherein the first value of the network performance metric is a first sum-capacity of the communication system and the second value of the network performance metric is a second sum-capacity of the communication system.

8. The communication system of claim 6, wherein the first value of the network performance metric is a first reliability of the communication system and the second value of the network performance metric is a second reliability of the communication system.

9. The communication system of claim 2, wherein at least some of the plurality of transmitters have access to partial network state information.

10. The communication system of claim 2, wherein the network state information is selected from a group consisting of strictly causal state information and causal state information.

11. The communication system of claim 2, wherein the network state information is non-causal.

12. The communication system of claim 2, wherein:
at least some of the plurality of transmitters are configured to transmit message and network state information to the cooperation facilitator while at least one of the plurality of transmitters is transmitting symbols via the multiple terminal channel to the receiver;
the encoder in at least one of the plurality of transmitters receives at least one cooperation parameter from the cooperation facilitator while at least one of the plurality of transmitters is transmitting symbols via the multiple terminal channel to the receiver;
and the encoder that receives the at least one cooperation parameter from the cooperation facilitator selects a next symbol of a codeword based upon the received at least one cooperation parameter.

13. The communication system of claim 2, wherein at least some of the plurality of transmitters are configured to transmit message and network state information to the cooperation facilitator that is selected from a group consisting of:
partial raw message information and partial raw network state information;
complete raw message information and partial raw network state information;
partial raw message information and complete raw network state information;
complete raw message information and complete raw network state information;
partial encoded message information and partial raw network state information;
complete encoded message information and partial raw network state information;
partial encoded message information and complete raw network state information;
complete encoded message information and complete raw network state information;
partial raw message information and partial encoded network state information;
complete raw message information and partial encoded network state information;
partial raw message information and complete encoded network state information;
complete raw message information and complete encoded network state information;
partial encoded message information and partial encoded network state information;
complete encoded message information and partial encoded network state information;
partial encoded message information and complete encoded network state information; and
complete encoded message information and complete encoded network state information.

14. The communication system of claim 1, wherein the multiple terminal channel is a multiple access channel.

15. The communication system of claim 14, wherein the multiple access channel is a shared wireless channel.

16. The communication system of claim 14, wherein the multiple access channel is a Gaussian multiple access channel with binary fading.

17. The communication system of claim 1, wherein the plurality of transmitters is two transmitters.

18. The communication system of claim 1, wherein the plurality of transmitters is at least three transmitters.

19. The communication system of claim 1, wherein cooperation parameters are transmitted by the cooperation facilitator by a first channel to the plurality of transmitters separate from the multiple terminal channel.

20. A cooperation facilitator, comprising:
a transmitter;
a receiver; and
a cooperation facilitator controller;
wherein the cooperation facilitator controller is configured to receive message information from a plurality of transmitter nodes via the receiver;
wherein the cooperation facilitator is configured to generate cooperation parameters based upon the message information received from the plurality of transmitter nodes, wherein a receiver node utilizes at least partial network state information to decode signals received via a multiple terminal channel; and
wherein the cooperation facilitator controller is configured to transmit cooperation parameters via the transmitter to the plurality of transmitter nodes, where the cooperation parameters enable encoders in each of the plurality of transmitter nodes to select a codeword from a plurality of codewords for transmission in a manner that is dependent upon network state.

21. The cooperation facilitator of claim 20, wherein the cooperation facilitator controller is configured to:
receive message and network state information from the plurality of transmitter nodes via the receiver;
generate cooperation parameters based upon the message and network state information received from the plurality of transmitter nodes; and
transmit cooperation parameters via the transmitter to the plurality of transmitter nodes, where the cooperation parameters enable encoders in each of the plurality of transmitter nodes to select the codeword from the plurality of codewords for transmission in the manner that is dependent upon network state.

22. The cooperation facilitator of claim 21, wherein the cooperation facilitator is configured to transmit cooperation parameters to the plurality of transmitter nodes that enable the encoder to select the codeword from the plurality of codewords for transmission in the manner that is dependent upon network state and wherein at least one message transmitted via a multiple terminal channel is encoded by another encoder.

23. The cooperation facilitator of claim 21, wherein a first value of a network performance metric of the cooperation facilitator achieved using codewords selected at least in part based upon the cooperation parameters received from the cooperation facilitator is greater than a second value of the network performance metric of the cooperation facilitator achieved with each of the plurality of encoders in the plurality of transmitter nodes encodes data without communicating with the cooperation facilitator.

24. The cooperation facilitator of claim 21, wherein the first value of the network performance metric is a first sum-capacity of the cooperation facilitator and the second value of the network performance metric is a second sum-capacity of the cooperation facilitator.

25. The cooperation facilitator of claim 21, wherein the first value of the network performance metric is a first reliability of the cooperation facilitator and the second value of the network performance metric is a second reliability of the cooperation facilitator.

26. The cooperation facilitator of claim 21, wherein the received network state information is partial network state information.

27. The cooperation facilitator of claim 20, wherein the network state information is selected from a group consisting of strictly causal state information and causal state information.

28. The cooperation facilitator of claim 20, wherein the network state information is non-causal.

29. The cooperation facilitator of claim 20, wherein the plurality of nodes is two nodes.

30. The cooperation facilitator of claim 20, wherein the plurality of nodes is at least three nodes.

* * * * *